(12) United States Patent
Gunn et al.

(10) Patent No.: US 6,618,106 B1
(45) Date of Patent: Sep. 9, 2003

(54) SUNLIGHT VIEWABLE COLOR LIQUID CRYSTAL DISPLAY USING DIFFRACTIVE COLOR SEPARATION MICROLENSES

(75) Inventors: Thomas V. Gunn, Candia, NH (US); Michael P. Schmidt, Hollis, NH (US)

(73) Assignee: BAE Systems Information and Electronics Systems Integration, INC, Nashua, NH (US)

( * ) Notice: Subject to any disclaimer, the term of this patent is extended or adjusted under 35 U.S.C. 154(b) by 0 days.

(21) Appl. No.: 09/621,144

(22) Filed: Jul. 21, 2000

Related U.S. Application Data
(60) Provisional application No. 60/145,551, filed on Jul. 23, 1999.

(51) Int. Cl.[7] .............................................. G02F 1/1335
(52) U.S. Cl. .................................................... 349/95
(58) Field of Search ............................................ 349/95

(56) References Cited

U.S. PATENT DOCUMENTS

| | | | |
|---|---|---|---|
| 3,997,240 A | * 12/1976 | Kebabian | ................ 350/96 R |
| 5,310,623 A | 5/1994 | Gal | |
| 5,482,800 A | 1/1996 | Gal | |
| 5,497,269 A | 3/1996 | Gal | |
| 5,600,486 A | 2/1997 | Gal et al. | |
| 5,633,737 A | * 5/1997 | Tanaka et al. | ................ 349/95 |
| 5,781,257 A | 7/1998 | Gal et al. | |
| 6,252,714 B1 | * 6/2001 | Guenther et al. | ........... 359/559 |

* cited by examiner

*Primary Examiner*—Toan Ton
*Assistant Examiner*—Andrew Schechter
(74) *Attorney, Agent, or Firm*—Maine & Asmus

(57) ABSTRACT

A high brightness, high color saturation liquid crystal display permits direct sunlight viewing. The display includes one or more diffractive color separation microlenses, in one embodiment, trimodal, which serves both to spatially separate incoming white light into red, green and blue bands and to focus the bands onto a subpixel matrix. A stepped and segmented surface of at least one microlens enables that microlens to provide a plurality of diffraction patterns.

2 Claims, 24 Drawing Sheets

SUNLIGHT VIEWABLE COLOR LIQUID CRYSTAL DISPLAY USING DIFFRACTIVE COLOR SEPARATION MICROLENSES

RELATED APPLICATIONS

This application is related to provisional patent application No. 60/145,551 filed Jul. 23, 1999.

FIELD OF THE INVENTION

This invention relates to liquid crystal displays and more particularly to a high brightness and high color saturation color liquid crystal display which is sunlight viewable.

BACKGROUND OF THE INVENTION

Liquid crystal displays have long been utilized for the display of information which is computer generated and which is to be viewable in direct sunlight, if possible. Such displays originated with the marine fishing industry in which so called super twist pixels were utilized to make a black and white display viewable in direct sunlight. This technology was extended for use in cockpit displays and indeed in other black and white displays in which the display was to have been used outdoors.

The problem with super twist crystals and the back and white displays was the amount of information that could be conveniently presented to the viewer. Many attempts have been made to adopt the super twist liquid crystal display technology for color liquid crystal displays in order to make them sunlight viewable.

The most recent attempts at such displays have been in the field of lap top commuters in which the lap top is provided with a liquid crystal display panel viewable from plus or minus 60 degrees for ease of usage. However, these displays wash out in bright sunlight primarily due to the reflection of the sunlight towards the viewer and lack of an ability to compensate for the reflection.

In the past, attempts to compensate for the reflection have centered around the utilization of so called anti-reflective coatings. However, the anti-reflective coating alone is insufficient to overcome the problem of daylight viewing given a limited power source. It will be appreciated that current liquid display stacks have an optical efficiency of only 5% when viewed from the point of view of the power in to the illuminator lamp verses illuminated power out. What this means is that while it may be possible to provide suitable daylight viewing liquid crystal displays, it is only at the cost of power consumption which in a portable application is not acceptable.

While in some applications power consumption is not the problem that it is portable applications, it is nonetheless important to be able to achieve the brightest, most highly visible color display possible to be able to counter the effects of direct sunlight and its reflection.

As illustrated in U.S. Pat. No. 5,600,486 issued to George Gal and Bruce Herman on Feb. 4, 1997 and assigned to the assignee thereof, color separation microlenses are described in which a single micro optical element is made up of a color separation grating integrated with a refractive lens. The color separation micro lens separates the spectrum into distinct color spots and focuses these spots into a common plain. These spots fall at the locations of different diffraction orders of the grating, with the color separation accomplished by the grating and the focusing being done by the lens. As mentioned in this patent, the color separation microlens can be fabricated as a monolithically integrated element or as a dual sided thin wafer.

While the color separation microlens described in U.S. Pat. No. 5,600,486 serves adequately for some applications, it has been found that the degree of color separation achievable with the stepped structure illustrated in this patent is insufficient to provide the necessary fineness of color separation required, for instance, for a 256×256 liquid crystal display. It will be appreciated that there are only a limited number of steps in the micro lens shown in the above identified patent with the steps being insufficient to provide sufficient color separation because the diffraction efficiency is determined by a number of factors including the number of steps. It can be demonstrated that the larger the number of steps the more fine will be the color separation and the more saturated will be each of the colors at the focal plane of the lens. Note that the fewer the number of steps in the microlens, the more the light spreads out which degrades the overall performance of the microlens.

It will also be appreciated that in this patent the color separation is in terms of spots or circles. With the step structure shown and the focusing properties of the lens it will be appreciated that what this patent describes is a means for providing focused spots of color as opposed to bands. However, as is common in color liquid displays the pixels are made up of three side by side rectangles which are separated by a mask. Thus the stepped structure and focusing described in this patent do not provide a pattern of colored bands which match to a rectilinear subpixel on the display.

Moreover, nowhere in the above mentioned patent is addressed the question of overall brightness of a display. It was sufficient for the Gal et al patent to be able to achieve color separation utilizing a microlens display. However, how a sunlight readable device is achievable using the Gal et al system it is not discussed within the patent.

However, as illustrated in U.S. Pat. No. 5,781,257 some of these issues are addressed, albeit with the same type of micro lens structure. In this patent it is pointed out that because of the color separation microlenses no color filters are required in the display which eliminates the light losses due to transmitting light through a color filter. It is however noted that the amount of brilliance of the display is directly proportional to the degree of color separation achievable and color saturation achievable by the microlens. The Gal et al device as described does not achieve maximal brightness or color saturation. More particularly, in a CIE color diagram while CRT displays in general conform to the best possible color saturation to generate the colors, and whereas color liquid crystal displays provide sufficient color saturation to permit portrayal of colored on-screen objects, the Gal et al patents and the microlens used therein do not permit depiction of a large number of colors, and more importantly, those colors normally utilized to portray colored on-screen objects.

By way of further background, it will be appreciated that in addition to the above mentioned patents which describe microlens structures, there are several methods in the prior art for fabricating microlenses. As can be seen in U.S. Pat. Nos. 5,310,623 and 5,482,800, photolithographic methods are described which permit the fabrication of microlenses utilizing a photoresist process, with a photoresist material replica used to reproduce the replica directly in a substrate material. Finally, a dispersive microlens is shown in U.S. Pat. No. 5,497,269 in which the dispersive microlens apparatus is used for detecting multiple different wavelengths or for combining a plurality of different emitted wavelengths into a bandwave of wavelengths.

SUMMARY OF THE INVENTION

A high brightness, high color saturation liquid crystal display permits direct sunlight viewing. The display includes a collimated light source, an array of diffractive color separation microlenses, in one embodiment, trimodal, generated from a genetic algorithm, which serve both to spatially separate incoming white light into red, green and blue bands which do not overlap and to focus the bands onto a subpixel matrix such that each of the sub-pixels is illuminated with only one color, a polarizer, an addressable color liquid crystal panel, a crossed polarizer and a gradient index diffuser with an anti-reflective coating. The diffractive color separation is of the iterative genetic algorithm which specifies the stepped surface of the lens that provide for exceptionally fine color separation. In one embodiment the genetic algorithm is applied iteratively to define the optimal stepped surfaces which are utilized to focus the various colors at different positions at the focal plane of the lens. The subject system improves the overall transmission efficiency of 5% for a standard liquid crystal display to in excess of 30% overall efficiency. This results in lower power requirements or alternatively a brighter display such that the displays are sunlight viewable and have application in lap top computers, cockpit displays, automobile instrument displays, ATM displays, projection displays, equipment displays, and in general any display of a color LCD nature which is to be viewed in direct sunlight.

More specifically, rather than utilizing the color filter techniques commonly used with color liquid crystal displays, and as a further improvement on the microlens separation techniques of Gal et al, in the subject system both the single mode and the trimodal microlenses are produced through the utilization of an iteratively applied genetic algorithm for providing optimal color separation and color saturation through the utilization of at least an order of magnitude more steps in the microlens than that described by Gal et al. In addition to the color saturation and separation being increased by the increased number of steps of the microlens, the iterative genetic algorithm also asks the computer to search for all allowable solutions to the color diffraction color separation problem, and provide an optimal solution based on the input parameters. The result is that not only is there finer color separation, to increase illumination of the subpixels and to minimize light incident on the mark as opposed to the subpixels, color saturation increases by an order of magnitude so as to permit the generation of all the colors required to depict on-screen graphical objects at the maximum brilliance.

ITERATIVE GENETIC ALGORITHM

The iterative algorithm for defining the stepped structure and the fresnel focusing is now described:

For purposes of this invention a genetic algorithm is an iterative method to design the surface profile of the color separator by defining several physical features of the surface profile as genes which are allowed to evolve to an optimal solution. For the present purposes the gene involved is the width of each of the optical elements. Other factors include the design wavelength and the focal plane as physical constraints. Each generation of the genetically defined surface function is scored with a testing function. High scoring surfaces are allowed to go on to the next generation, thus to provide a test of the fit of the surfaces to provide an ideal result.

In the present case the widths and heights of all portions of the design including the diffraction grating and the fresnel portion are provided in terms of a set of seed functions. The resulting surface profile is tested with the testing function, with the testing function giving an overall weight to the profile generated. Succeeding generations of the design are based on the initial seeds plus random elements to allow for genetic variation. Iteratively stepping through this process provides a maximal fit for optimal design.

In one embodiment, with physical constraints as to step width and the overall pixel size, a seed set is generated which includes a particular step width and a pattern of step heights for each element. In one embodiment the microlens is to have a 330 micron diameter. This is broken up into 1.2 micron elements. The seed set generates a surface which is tested using standard diffraction grating theory to ascertain the diffraction efficiency and focusing capability. Standard diffraction grating theory is described in a text entitled Optics by Hecht, p. 312–465 in a section entitled Diffraction. The surface profile of the microlens can be described as a transmission phase grating with non-uniform placement of elements. The test function analyzes the phase contribution from each element from first principles of Diffraction theory.

The test determines at a given off axis angle what the expected light intensity should be at a given color. The test also convolves the focusing merit figure, so that after a number of iterations in which random variations are added, an optimal solution is finally achieved.

This is accomplished by crossing for instance 5 seeds with each other. This means that the result of one seed is crossed with the result of another seed, with the results being tested. If 5 seeds are crossed one can obtain as many as 25 testable results. These results are tested and the worst 20 are discarded. The results are then crossed again along with a random seed input to permit the genetic change.

Thus, in general a genetic algorithm is one in which as number of seeds are used to create a result. The results are then crossed with each other to obtain multiple results which are then tested. Superior results are selected and crossed with each other along with a random seed factor and the results tested again. In this manner a large number of results can be tested to determine the optimal result.

EFFICENCIES

In addition to the color separation and color saturation improvements, the system provided results in an overall efficiency of in excess of 30% over common color liquid crystal display technologies. The reason is not only the elimination of the color filters normally utilized in these displays which result in only a 5% efficiency, the utilization of the subject microlens permits the utilization of gradient index diffuser and anti-reflective coating to permit wide angle viewing while at the same time rejecting reflected sunlight. It will be appreciated that in the past, anti-reflective coatings have been traditionally utilized on liquid crystal displays but have been relatively ineffective because of the holographic diffusers normally utilized. Rather than utilizing a holographic diffuser, in the subject system a gradient index diffuser is useable which provides a wide angle of viewing suitable for the application requirements and is also capable of being coated with an anti-reflective coating due to the fact that its surface is smooth.

The result of utilizing the subject microlens array and the specific diffuser and anti-reflective coating is that it is now possible to provide sunlight viewable color liquid crystal displays in which all of the required colors can be generated. It is also important, due to the subject system, that power requirements are significantly reduced due to the 30% plus effective optical efficiency. This means battery life for portable devices such lap top computers will not suffer with the provision of the increased brightness and increased color saturation display.

In summary, a system is provided for increasing the brightness and color saturation of a liquid crystal display to permit direct sunlight viewing which includes the utilization of an array of diffractive color separation microlenses which serve both to spatially separate incoming white light into red, green and blue bands which do not overlap and to focus the bands onto a subpixel matrix such that each of the sub-pixels is illuminated with only one color. The diffractive color separation is made possible through the utilization of the iterative genetic algorithm which specifies the stepped surface of the lens that provide for exceptionally fine color separation. In one embodiment the genetic algorithm is applied iteratively to define the optimal stepped surfaces which are utilized to focus the various colors at different positions at the focal plane of the lens. The subject system improves the overall transmission efficiency of 5% for a standard liquid crystal display to in excess of 30% overall efficiency. This results in lower power requirements or alternatively a brighter display such that the displays are sunlight viewable and have application in lap top computers, cockpit displays, automobile instrument displays, ATM displays, projection displays, equipment displays, and in general any display of a color LCD nature which is to be viewed in direct sunlight.

BRIEF DESCRIPTION OF THE DRAWINGS

These and other features of the subject invention will be better understood in connection with the Drawings and conjunction with the Detailed Description, of which.

DETAILED DESCRIPTION

Figure 1:
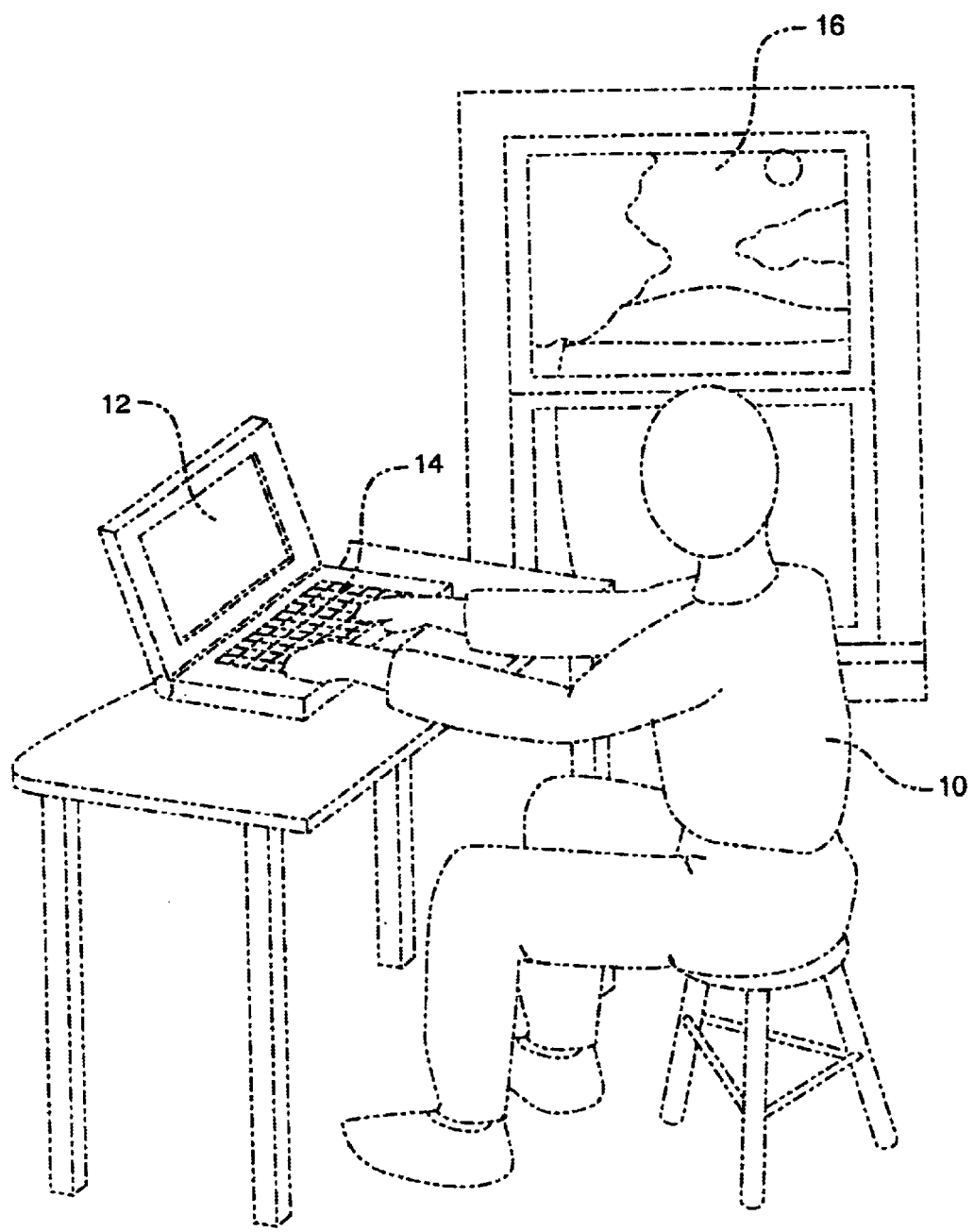
FIG. 1 is a diagrammatic illustration of a lap top application requiring an increased brightness, increased color saturation display suitable for direct sunlight viewing.

Referring now to FIG. 1, an individual 10 is depicted as viewing a liquid crystal display 12 of a laptop computer 14 which is bathed in sunlight through window 16. It will be appreciated that it is only with difficulty that the individual can ascertain the graphical objects on the liquid crystal display due to the reflection of the sunlight towards the viewer of the display. While liquid crystal displays have been utilized routinely in darkened or semi-darkened surroundings to great effect, as mentioned hereinabove, the sunlight tends to wash out the screen making daylight viewing difficult.

Figure 2:
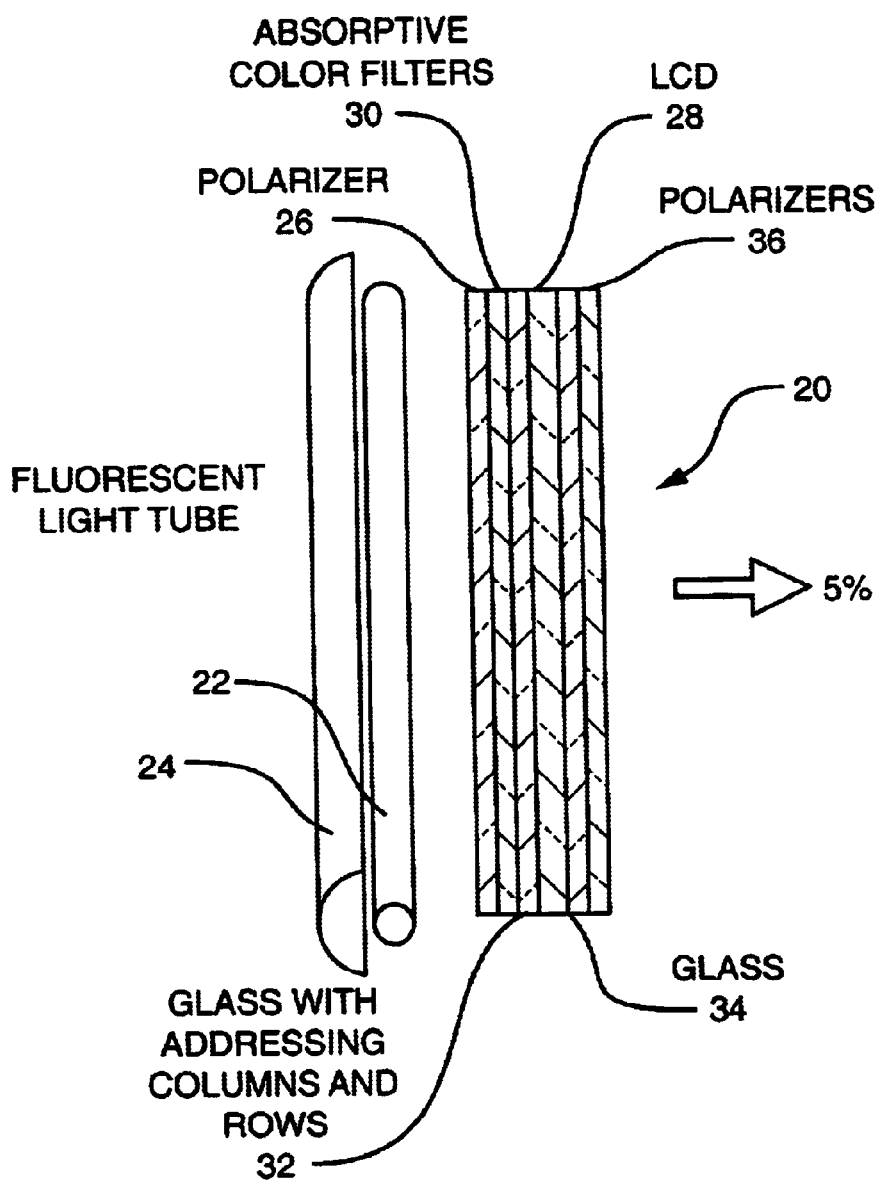
FIG. 2 is a cross-sectional and diagrammatic illustration of a prior liquid crystal display illustrating the utilization of absorptive color filters which, in combination with the losses across the liquid crystal display stack, result in only a 5% throughput.

One of the reasons that the prior art liquid crystal display panels were not sunlight viewable can be seen in connection with FIG. 2 in which a liquid crystal display stack 20 is illustrated as being illuminated with a light source 22, in most cases a fluorescent light tube, which has its light redirected towards the display by a reflector 24. The light from light source 22 is filtered by a polarizer 26 the purpose of which is to permit modulation of the light in a subpixel of a liquid crystal display 28. Prior to modulation, absorptive color filters 30 are interposed between liquid crystal display 28 and polarizer 26. The purpose of the absorptive color filters is to provide a pattern of red, green and blue light adjacent the subpixels of the liquid pixel display so that the white light from the light source is divided up into the primary red, green, blue colors and is made available immediately adjacent the corresponding red, green and blue subpixels.

In order to provide the appropriate modulation, a glass plate with addressing columns and rows 32 is interposed between absorptive color filters 30 and liquid crystal 28, with a glass plate 34 utilized to contain the liquid crystal between itself and glass plate 32. Polarizers 36 are provided on the outside of glass plate 34 to permit the aforementioned modulation of light passing through the subpixel elements in liquid crystal display 28. As will be seen in connection with FIG. 3, the efficiency of such a prior art stack is only 5%, which requires either a very large power source to provide for adequate brightness or utilization of the device only in dim environments.

Figure 3:
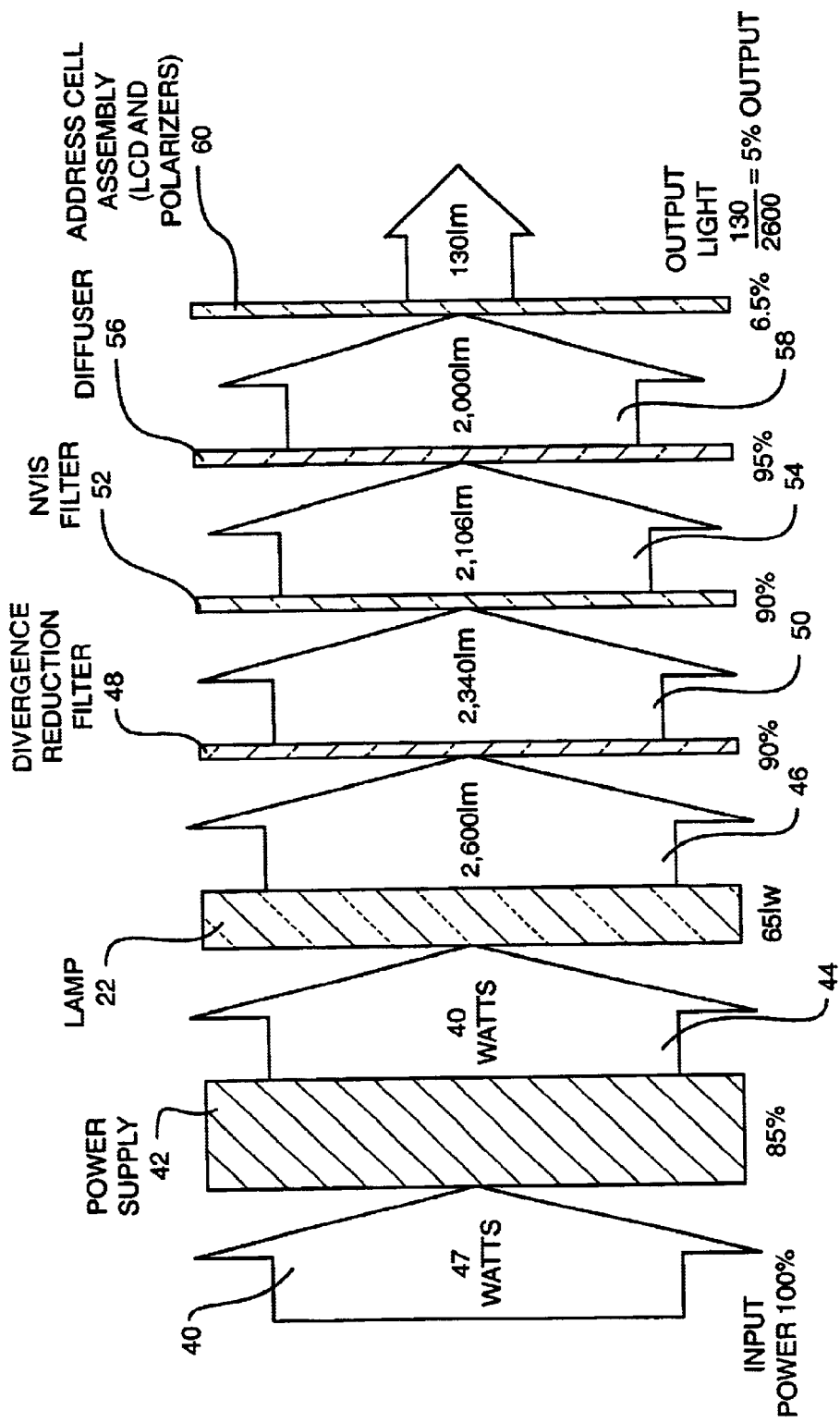
FIG. 3 is a diagrammatic illustration of the losses incurred in the utilization of a prior color liquid crystal display stack illustrating that for a 47 watt input power only 130 lumens of light energy exits the display.

Referring now to FIG. 3, in one military night vision application assuming a 47 watt power input is illustrated at 40, a power supply 42 has an efficiency of 85% which provides a 40 watt output as illustrated at 44. This output is applied to a fluorescent lamp 22, which in one case is a 65 lumens per watt lamp. The result is a 2600 lumen output as illustrated at 46. This output impinges on divergence reduction filter 48 which has a transmissivity of 90%. It is the purpose of the divergence reduction filter to focus light into the required viewing angle. The output 50, of this filter is 2340 lumens. This light impinges on NVIS filter 52 the purpose of which is to cut off wavelengths lower than a defined point for night vision viewing for military purposes. The output of filter 52, as illustrated at 54, is 2106 lumens which impinges upon a diffuser 56, the purpose of which is to keep the light uniform so that when it bathes the liquid crystal display the liquid crystal display is uniformly illuminated. The output of such a diffuser as illustrated at 58 is 2000 lumens. This output is directed towards address cell assembly 60 which includes both the liquid crystal display and its associated polarizers. The address cell assembly includes the aforementioned colored filters, polarizers and active matrix, such that the output of this assembly is only 130 lumens. The efficiency of this so-called stack is on the order of 6.5%. The output light at 130 lumens compared to the light input of 2600 lumens provides an overall efficiency of only 5%.

Figure 4:
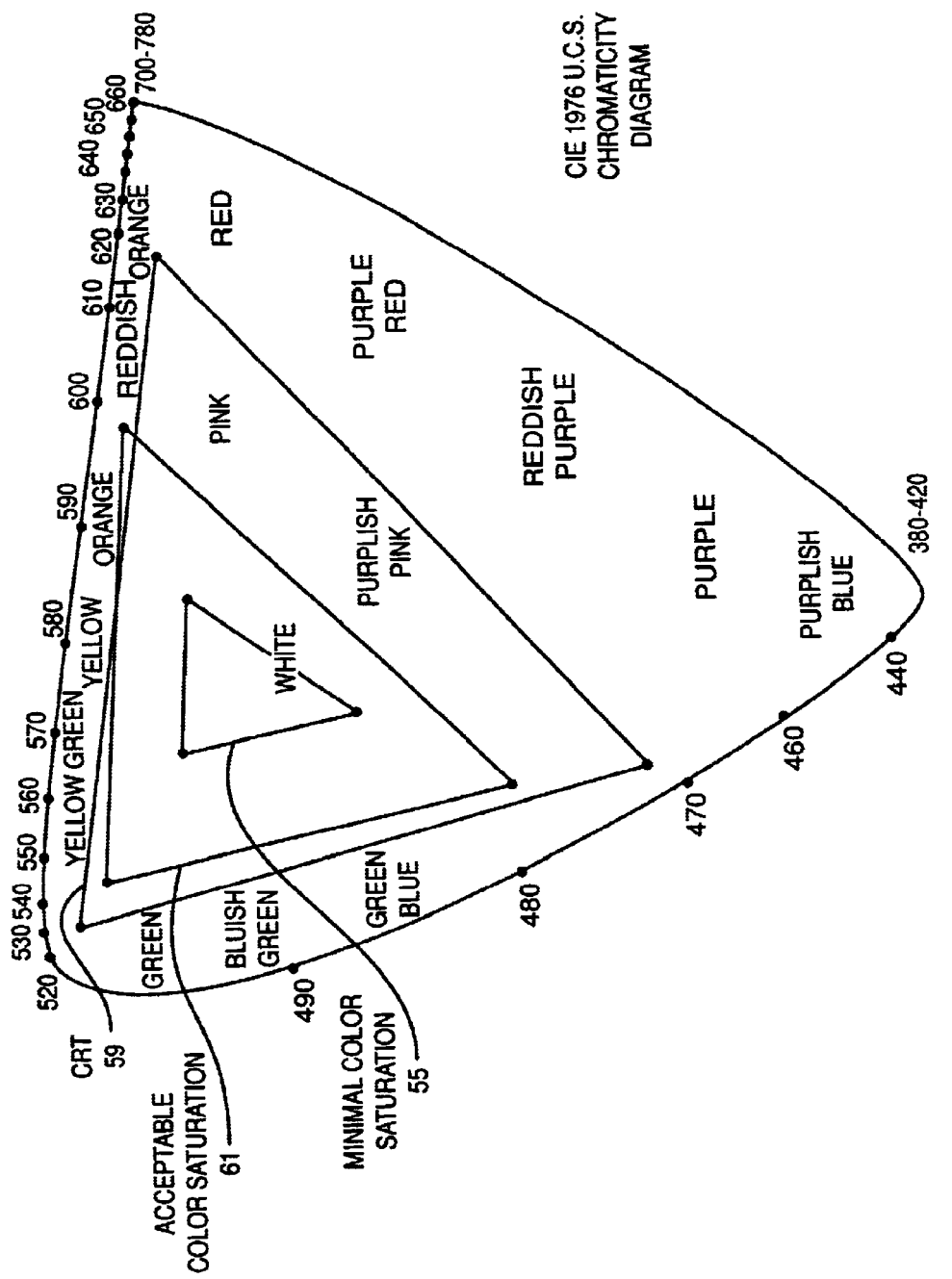
FIG. 4 is a CIE graph illustrating color saturation for various color displays, including that associated with the Gal et al patents.

If the 5% overall throughout efficiency of the prior color liquid crystal displays were not enough, even assuming one were to utilize the liquid crystal display systems of the aforementioned Gal et al patents, the color saturation as illustrated at 55 in FIG. 3 would be insufficient to provide the colors necessary for depiction of graphical objects. It will be appreciated that the CIE graph of FIG. 4 illustrates the desired color saturation at 100% for the depiction of colored objects, as illustrated at 57. As illustrated by graph 59, this graph corresponds to the color saturation for a normal color CRT display which indeed is quite adequate for the depiction of colored graphical objects. On the other hand, as illustrated by the inner graph 55 associated with the Gal et al patent, the color saturation is well below 50% of that required for adequate depiction of colored graphical objects. The reduced color saturation is that which results from the system described in the Gal et al patents and is due to the limited ability of the stepped surfaces of the lenses to be able to provide adequate color separation or indeed adequate intensity of the colored spots. Moreover, since the Gal et al patents refer to the focusing of colored spots on a liquid crystal display, it will be appreciated that round spots projected onto rectangular subpixels cannot create color saturation to the desired level. With the subject system as will be described the utilization of highly separated bands of color provides for increased color saturation so as to match that attainable with color CRT displays.

On the other hand, the color saturation associated with the subject system as illustrated at 61 provides substantial color saturation improvement as will be discussed due to the fine structure of the diffraction grating and the genetic algorithm used to generate it.

Figure 5A:
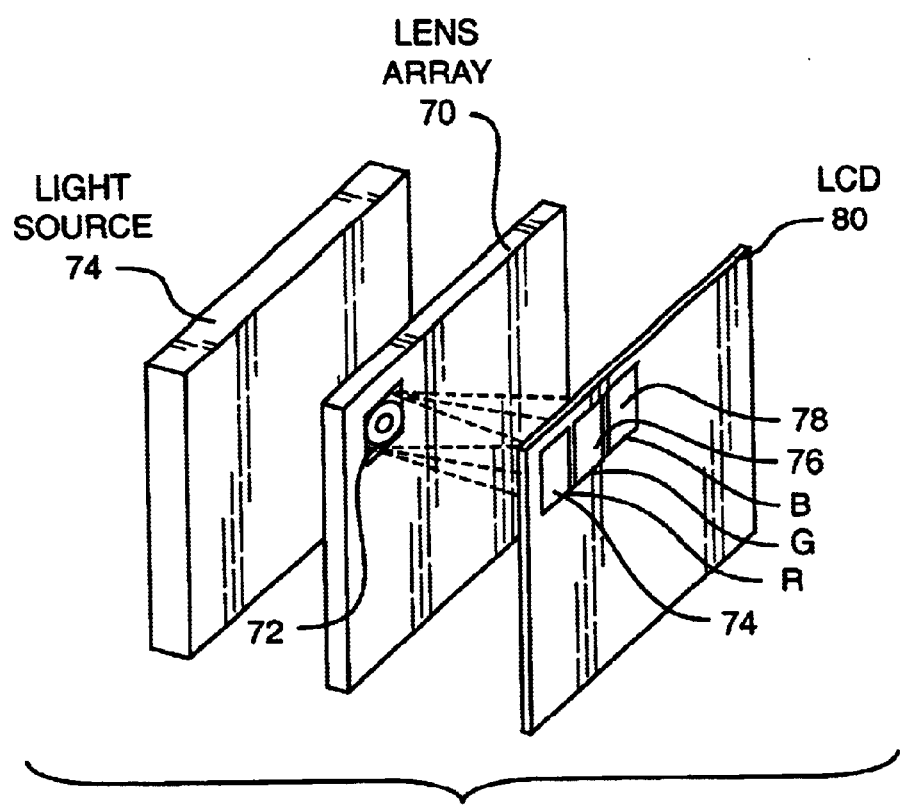
FIG. 5A is a diagrammatic and exploded view of the subject system illustrating a light source, and a liquid crystal display panel which sandwich a microlens array in which each of the microlenses focuses and separates the incident light into colored bands which are focused respectively on the red, green and blue sub-pixels of the liquid crystal display.
Figure 5B:
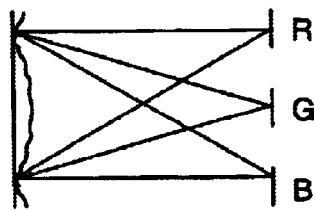
FIG. 5B is a schematic diagram of the focusing of the red, green and blue bands onto the sub-pixels of a liquid crystal display.

In contradistinction to the system illustrated in FIG. 2, and referring now to FIG. 5A, subject lens array 70 includes a number of microlenses 72 which is utilized to separate the white light from a collimated light source 74 and project it in columns or bands to subpixels 74, 76, and 78 of a liquid crystal display 80, with the subpixels generating respectively red, green and blue components for each pixel. As will be seen, it is the purpose of microlens 72 to be able to accurately separate the white light into the aforementioned columns or bands such that the particular colored band only is incident on its respective subpixel. Moreover, it is the purpose of the subject microlens that the color saturation at each of the subpixels exceeds 16 dB. This compares the amount of the color of the corresponding subpixel versus light leaking from other sources.

Figure 6:
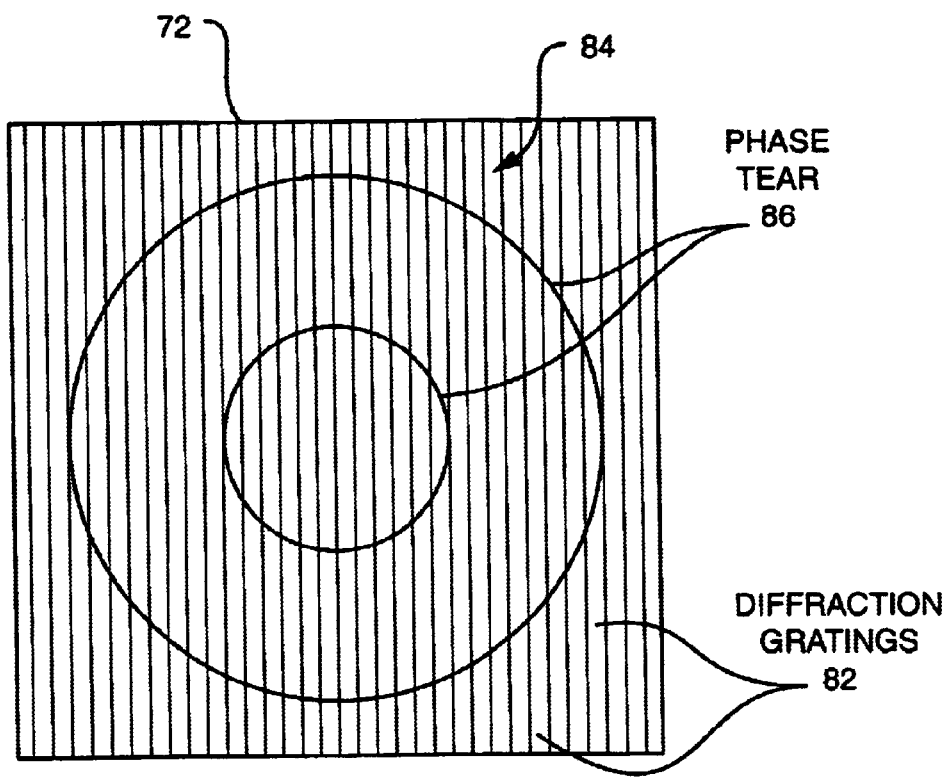
FIG. 6 is a top view of the microlens of FIG. 5A showing the grating lines for the microlens as well as phase tears utilized in the focusing portion of the lens.

One possible structure of each microlens is illustrated in FIG. 6 in which the lens has a number of diffraction grating lines 82 across its face 84, with the surface of the lens being provided with a fresnel pattern for focusing purposes, with the fresnel structure being diagrammatically illustrated by phase tears 86.

Figure 7:
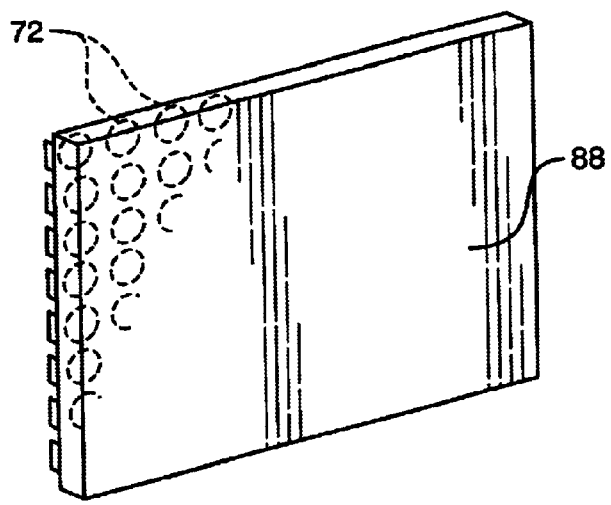
FIG. 7 is a diagrammatic illustration of the placement of the microlenses on the back of a glass substrate which spaces the lenses from the sub-pixels of the liquid crystal display such that the sub-pixels lie on the focal plane of the lenses.

Referring to FIG. 6, a number of microlenses 72 are arrayed on the back surface of a glass plate 88 which serves to space the lenses from the liquid crystal subpixel elements as illustrated in FIG. 7.

Referring now to FIG. 7, collimated light in one embodiment illuminates the microlens array 72 as illustrated, with the lenses being supported by glass plate 88 such as illustrated in FIG. 6.

Figure 8:
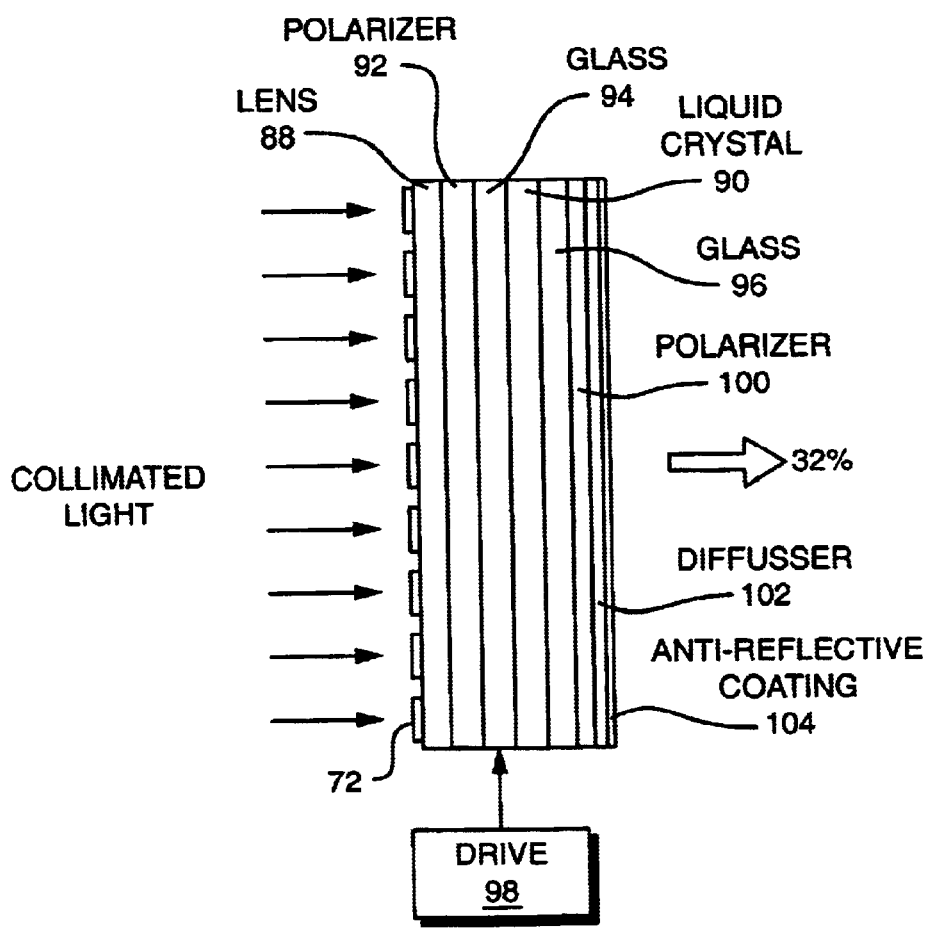
FIG. 8 is a diagrammatic and cross-sectional view of the subject liquid crystal display stack illustrating the utilization of collimated light which impinges upon the microlenses and then through a polarizer, glass plate having an active pattern the matrix for driving the display, followed by the liquid crystal display panel, followed by a further glass plate to hold in the liquid crystal display, followed by a polarizer, followed by a diffuser, and finally out through the anti-reflective coating on the exterior surface of the diffuser.

Referring now to FIG. 8, between glass plane 88 and liquid crystal 90 is a polarizer 92 which serves the same purpose as that specified hereinabove. Glass plate 94 carries the active matrix addressing system for the subpixels, whereas the liquid is contained by another glass plate 96. The drive for the liquid crystal display is illustrated at 98.

The light output from the liquid crystal is passed through a polarizer 100 and thence through a diffuser 102 which is of the gradient index type and has a flat exterior surface. An anti-reflective coating 104 is applied across this flat surface, such that the overall efficiency of this stack, rather than being 5% is better than 32%. Note, that the particular flat surface diffuser permits use of an extremely effective anti-reflective coating to improve sunlight visibility while providing wide angle viewing.

The overall effect of the subject stack is to provide a brightness not heretofore possible, given the power constraints of a portable device while at the same time providing reflection of sunlight to a degree not heretofore possible.

Figure 9:
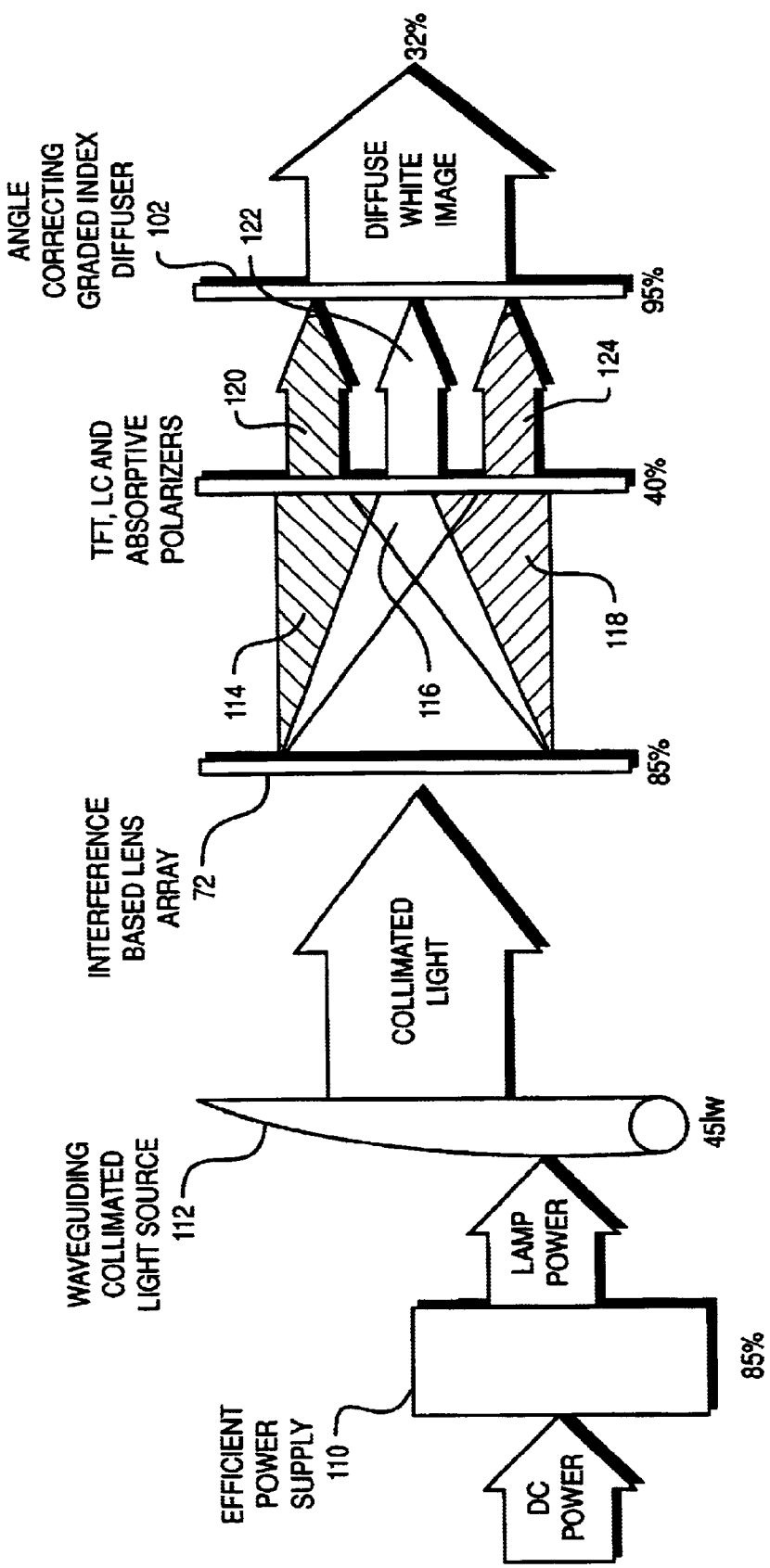
FIG. 9 is a diagrammatic illustration showing the overall efficiency of the subject color liquid crystal display indicating the percentage transmission through each of the elements of the stack, illustrating a 32% efficiency.

Referring now to FIG. 9 and the overall efficiency of the subject stack, in one embodiment an efficient power supply 110 is provided, with the overall efficiency being 85%. A collimated light source is provided at 112 which provides 45 lumens per watt directed towards the interference based lens array 72 which itself has an efficiency of 85% as opposed to 17% for absorptive color filters. The focused and separated light bands here illustrated at 114, 116, and 118 impinge upon a thin film transistor, liquid crystal and absorptive polarizer stack generally illustrated in FIG. 7 which has an efficiency of 40%. The output as illustrated at 120, 122, and 124 impinges on the angle correcting gradient index diffuser 102 of FIG. 7 to provide an overall diffuse white image, with the angle correcting gradient index diffuser 102 having a transmission of 95%. It can therefore be seen that the overall efficiency of the subject system is in excess of 32% as opposed to 5% in the prior art. Thus, it will be appreciated that the subject system has at least a 5 to 1 efficiency improvement over that attainable over conventional color liquid crystal displays art.

Figure 10:
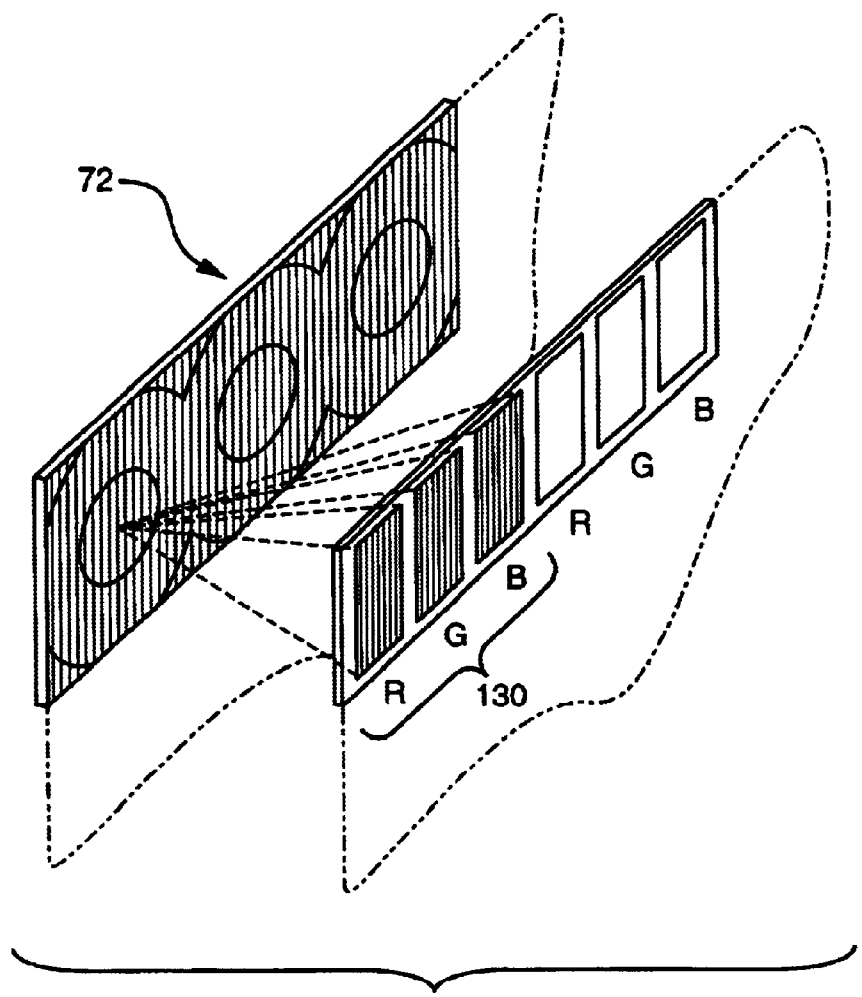
FIG. 10 is a diagrammatic illustration of a portion of the microlens array of FIG. 5A indicating the ability to project onto rectangular sub-pixels the red, green and blue bands required for their illumination.

Referring now to FIG. 10, a portion of array 72 is shown to illustrate the side by side microlens array in which each of the microlenses is responsible for triple subpixel elements here illustrated at 130. The advantages of the subject microlens are due to the iterative genetic algorithm utilized in the generation of the surface of the lens.

Figure 11:
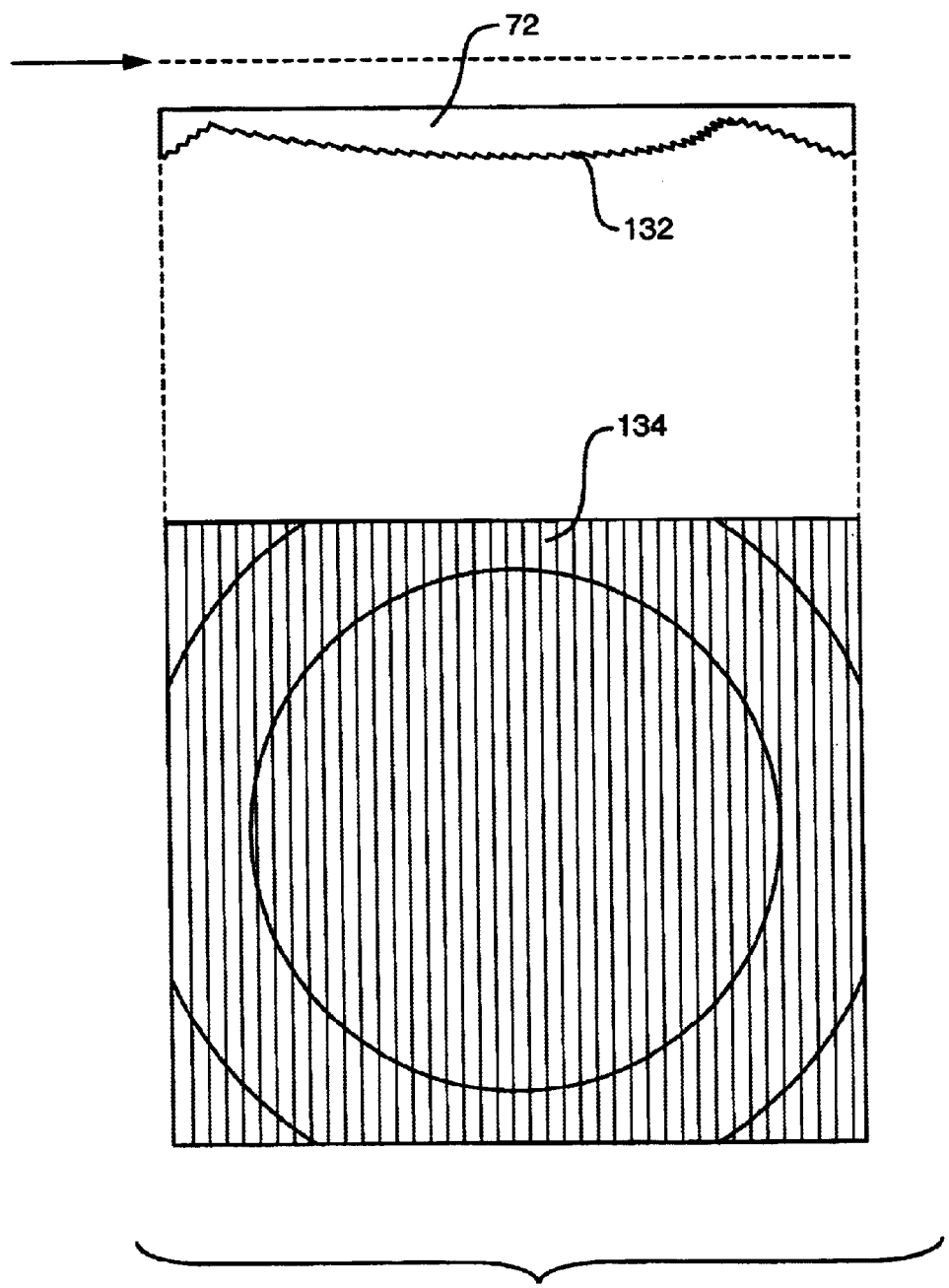
FIG. 11 is a diagrammatic illustration of the correspondence of the diffraction grating on the lens to a cross-sectional view of the lens itself.

Referring to FIG. 11, a cross sectional view of a microlens 72 is illustrated in which the lens surface 132 has ruled or etched diffraction steps or lines which are carried forward as illustrated in the top view as lines 134. It is the position and configuration of these lines which provides for the aforementioned exceedingly fine color separation leading to not only enhanced color saturation but also the ability to focus the colored band or column directly and accurately onto a subpixel without having to illuminate the mask in between the subpixels.

Figure 12:
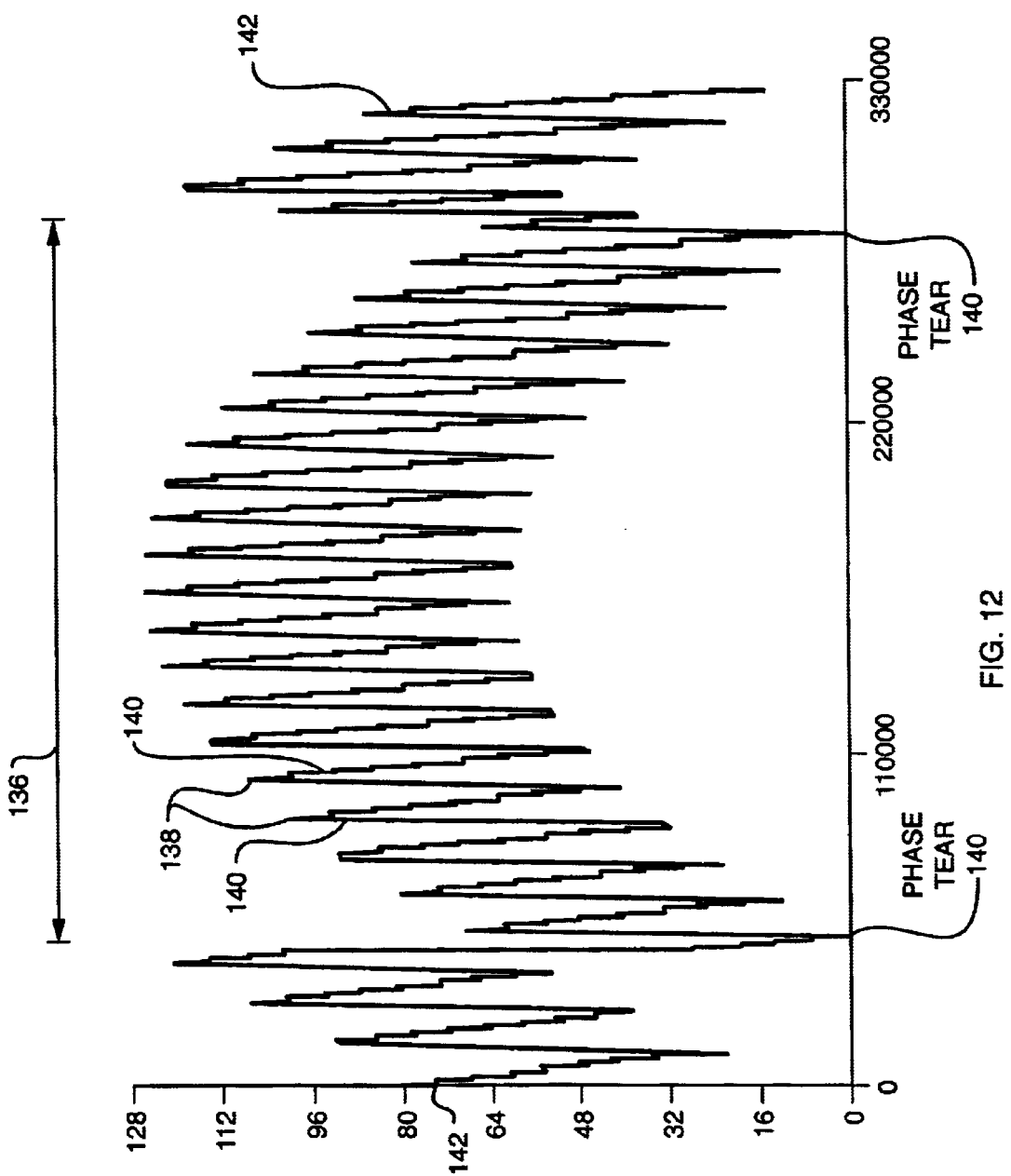
FIG. 12 is a graph showing the surface structure of the microlens in phase space in which horizontal distances lie on the X axis and in which the vertical axis carries the phase information, with the phase information being one to one correlatable to the length design point.

The specific structure of the microlens surface is illustrated in FIG. 12, in which distance is displayed on the X axis, whereas phase space is depicted on the Y axis. It will be appreciated that were the graph to contain distance on the X axis and distance on the Y axis equally, the structure would not be visible for illustrative purposes.

What can be seen is that for each microlens there is central region by arrow 136, the fresnel structure of which defines the focusing function of the lens. Each of the fraction lines here illustrated at 138 has a stepped structure 140 which is defined by the subject genetic algorithm. It is the purpose of the steps to separate the incident light into colored bands having sharply defined edges. Without these sharply defined edges, overlapping illumination would occur at each of the subpixels and light would be lost through illumination of the mask between the subpixels.

As can be seen phase tears 140 and 142 define the fresnel lens portion of the microlens. It will be appreciated that a fresnel configuration is utilized for the microlens structure to provide a relatively flat, with the lens curvature being provided by the fresnel structure.

MASK ILLUMINATION CONSIDERATIONS

Figure 13:
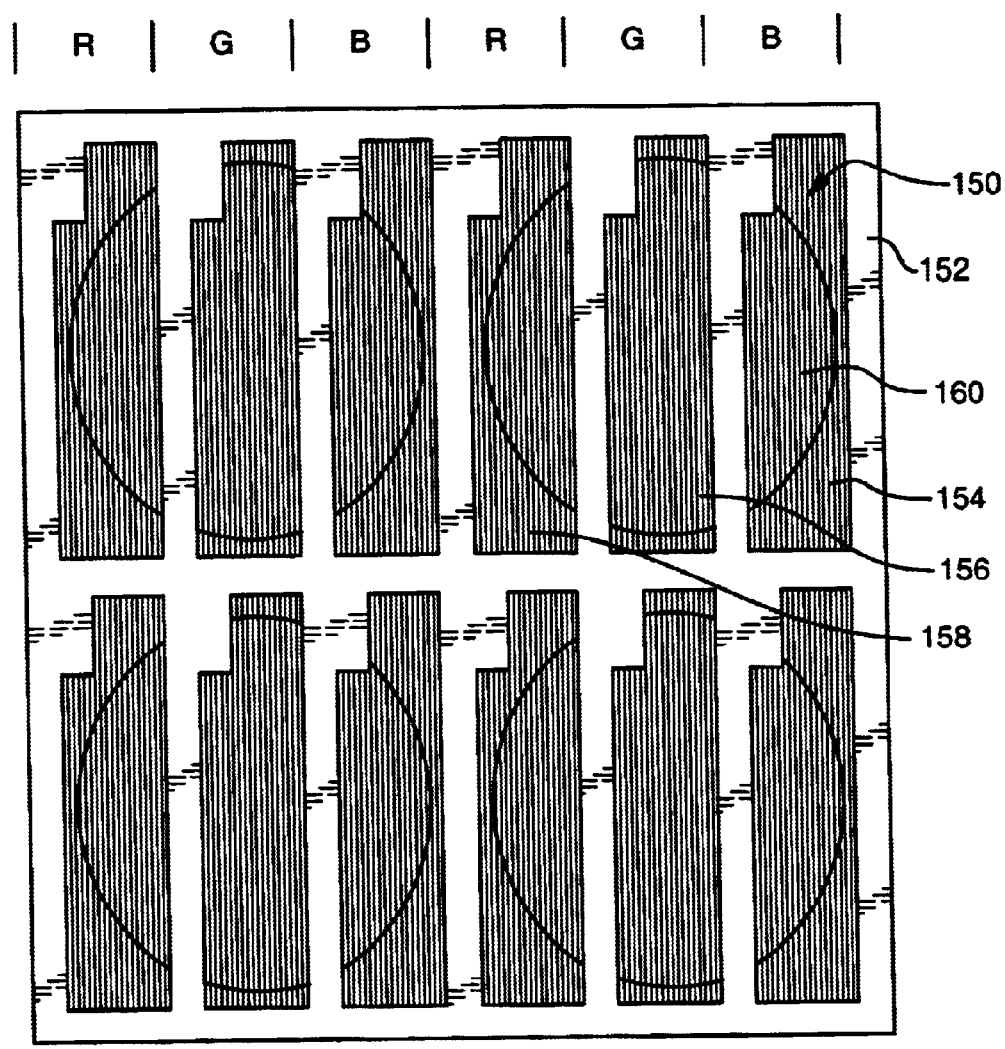
FIG. 13 is a top view of a portion of the subject light crystal display having rectangularly masked sub-pixels, with the corresponding microlens being viewable therethrough.

Referring now to FIG. 13, a portion of the liquid crystal display 150 is shown with a mask 152 masking off separate regions 154, 156, and 158 corresponding respectively to the blue, green and red regions to be illuminated. As pictured immediately under the mask illustrated at 152 is microlens 160, with FIG. 12 being a top view looking through the liquid crystal display and mask towards the microlens.

Figure 14:
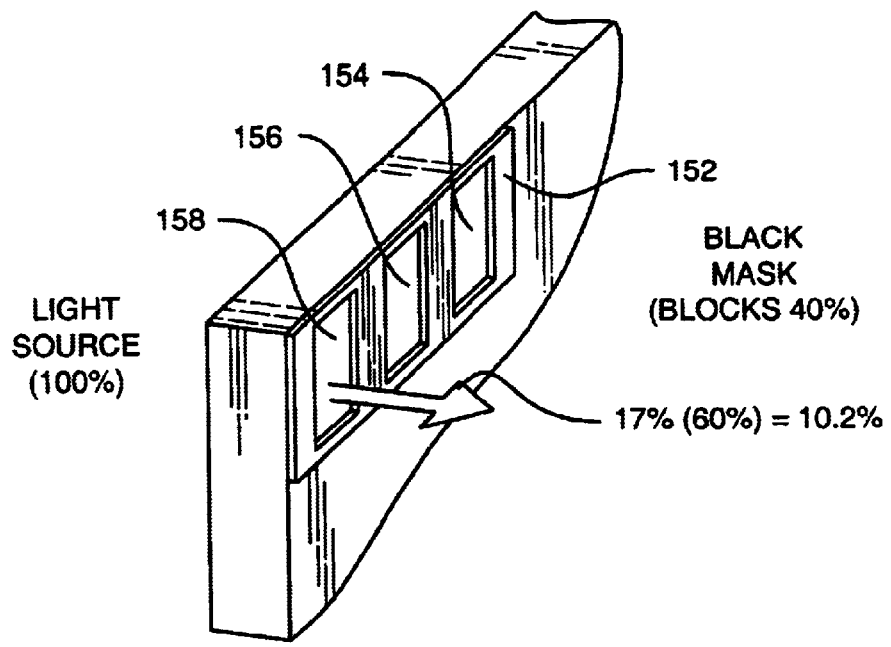
FIG. 14 is a diagrammatic illustration of a prior art liquid crystal display mask in which the mask blocks out close to 40% of the incident light on the liquid crystal display.

Referring now to FIG. 14, and referencing to prior art liquid crystal displays, it will be appreciated that mask 152 has masked off regions between pixels 154, 156, and 158. Because the light from the color filters is incident upon not only the mask but also the subpixel regions, the mask blocks close to 40% of the light. The result is a throughput or efficiency of only 60% of the 17% of the light available at the liquid crystal display, leaving an efficiency of only 10.2%.

Figure 15:
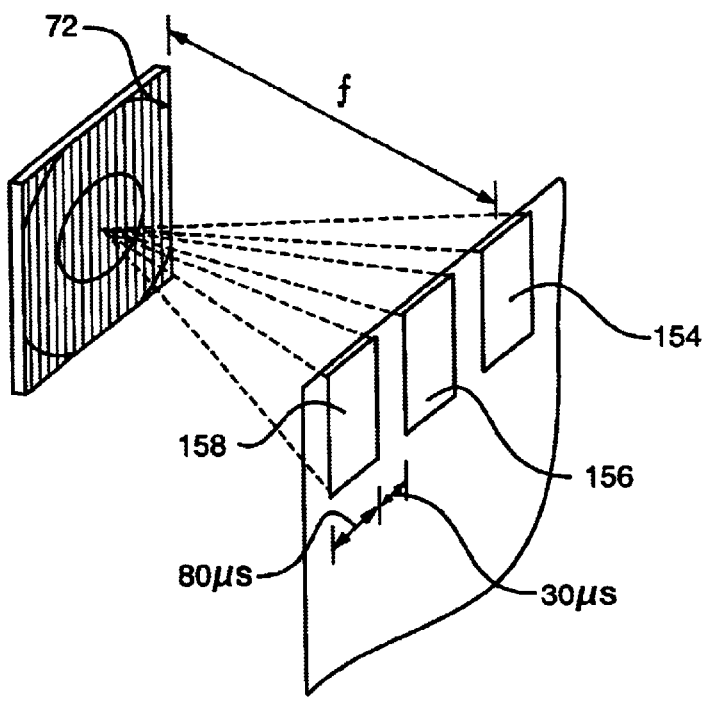
FIG. 15 is a diagrammatic illustration of the ability to eliminate the effect of the mask on the system by the ability to exactly focus bands of different colors to corresponding different subpixel elements, thereby eliminating the mask illumination associated with the system of FIG. 14.

In contradistinction, and as illustrated at FIG. 15, microlens 72 provides exact and accurate illumination of subpixels 154, 156, and 158 such that the mask blocks virtually none of the incident light. In one embodiment, the width of the subpixels is on the order of 80 microns whereas the space between the subpixels in on the order of 30 microns. It will be appreciated that it is the 30 micron space which heretofore has light incident on it, but from which losses occur.

LIGHT COLLIMATOR

Figure 16:
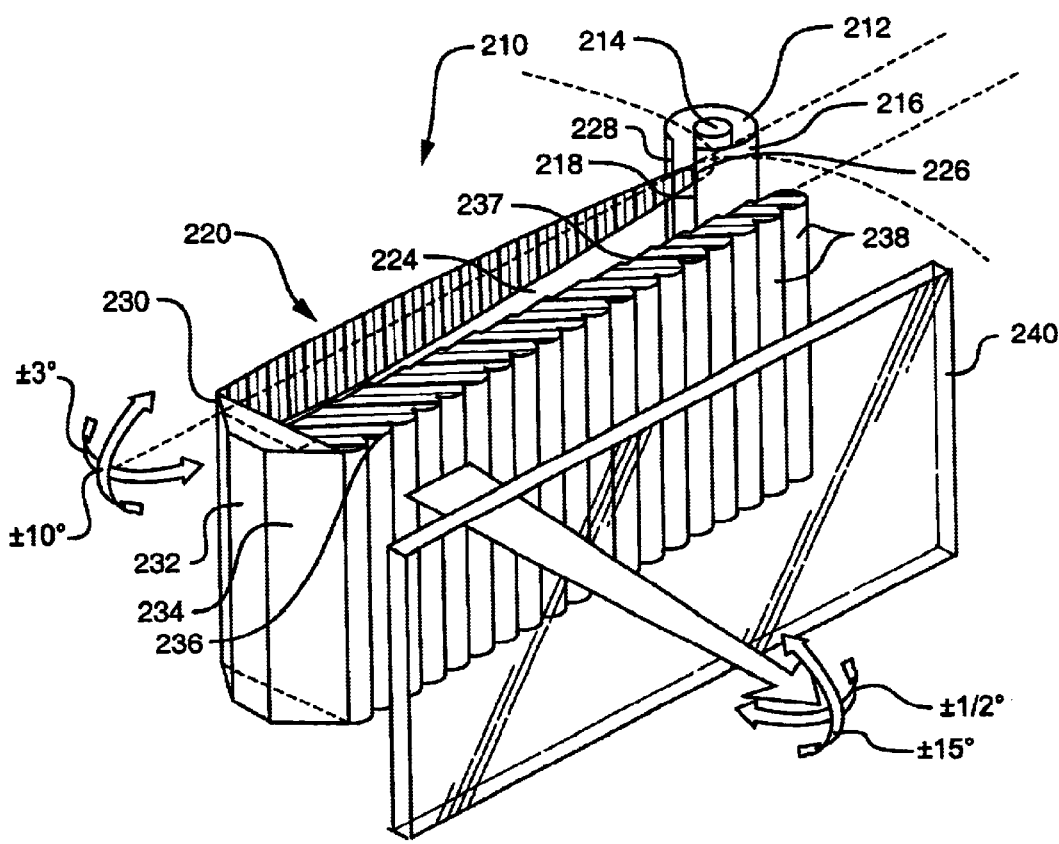
FIG. 16 is a diagrammatic illustration of one embodiment of a light collimator in which collimated light is collimated in the vertical direction to plus or minus one half a degree, thereby permitting the maximally fine focusing of the colored bands by the microlens assembly of FIG. 8.

What is now described is a collimator suitable for use with the subject microlens array and color liquid crystal display. Referring now to FIG. 16, a collimator 210 in one embodiment collimates the light from a lambertian light source 212 that in a preferred embodiment includes a fluorescent tube 214 which has a longitudinal axis therethrough. Tube 214 is surrounded by a diffuse reflector 216 which has an exit slit 218, with the edges of exit slit 218 providing the focus for opposed parabolas of a waveguide, illustrated here at 220.

It will be appreciated that waveguide 220 in one embodiment is made of a transparent material, conveniently acrylic or glass, in which sides 222 and 224 of the waveguide are parabolic. The parabolas for this waveguide have a focus at an opposed edge of the exit slit such that for instance, parabolic surface 222 has its focus 226 at the edge which is said to opposes this surface. Likewise parabolic surface 224 has its focus 228 at the indicated edge.

It is the purpose of the parabolic surfaces of waveguide 220 to redirect the light from the exit slit of the light source such that light which is normally dispersed in an arc of 180 degrees is redirected down the wave guide and exits exit aperture 230 of waveguide 220, with a collimation of +/−3 degrees in the horizontal direction. The collimation of the light in the vertical direction is plus or minus 10 degrees, with the collimation being performed as illustrated in FIGS. 17 and 18 by top and bottom portions of the waveguide which also have parabolic surfaces. As used herein, this type of parabolic arrangement is referred to as a crossed parabolic collimator.

The light exiting aperture 230 is folded back on itself by 45 degree mirrors 232 and 234 into a reflective array 236 which functions to redirect the light down through the array at a direction normal to the light path for providing an extended panel of illumination, with the light being collimated in the horizontal direction to +/−½ degree. In order to collimate the light in the horizontal direction, reflective array 236 is provided with a number of cylindrical lenses 238 on the face thereof. These lenses serve to further collimate the +/−3 degree collimated light from waveguide 220 such that the +/−½ degree collimation is achieved in the horizontal direction.

Note that the original collimation of +/−10 degrees for the vertical direction is somewhat degraded such that the collimation in the vertical direction is degraded to +/−15 degrees. However, mentioned above, the vertical collimation degradation is not important when the subject collimator is utilized for liquid crystal displays in which the sub-pixels are laid out in a horizontal direction. It will be appreciated that the degradation in the vertical direction is due to the emission of light from the array into free air.

This light is projected in one embodiment towards a color liquid crystal display here shown in dotted outline by reference character 240, with the characteristic of this display being that it is provided with a microlens array between the light source and the liquid crystals themselves, with the liquid crystal display sub-pixels being arrayed as red, green, and blue sub-pixels in the horizontal direction. It is important in this type of liquid crystal display that the incoming light be collimated to a fairly high degree. If the incoming light is not collimated, as mentioned hereinbefore, there will be a smearing out of the colors, such that color separation is difficult to maintain.

Figure 17A:
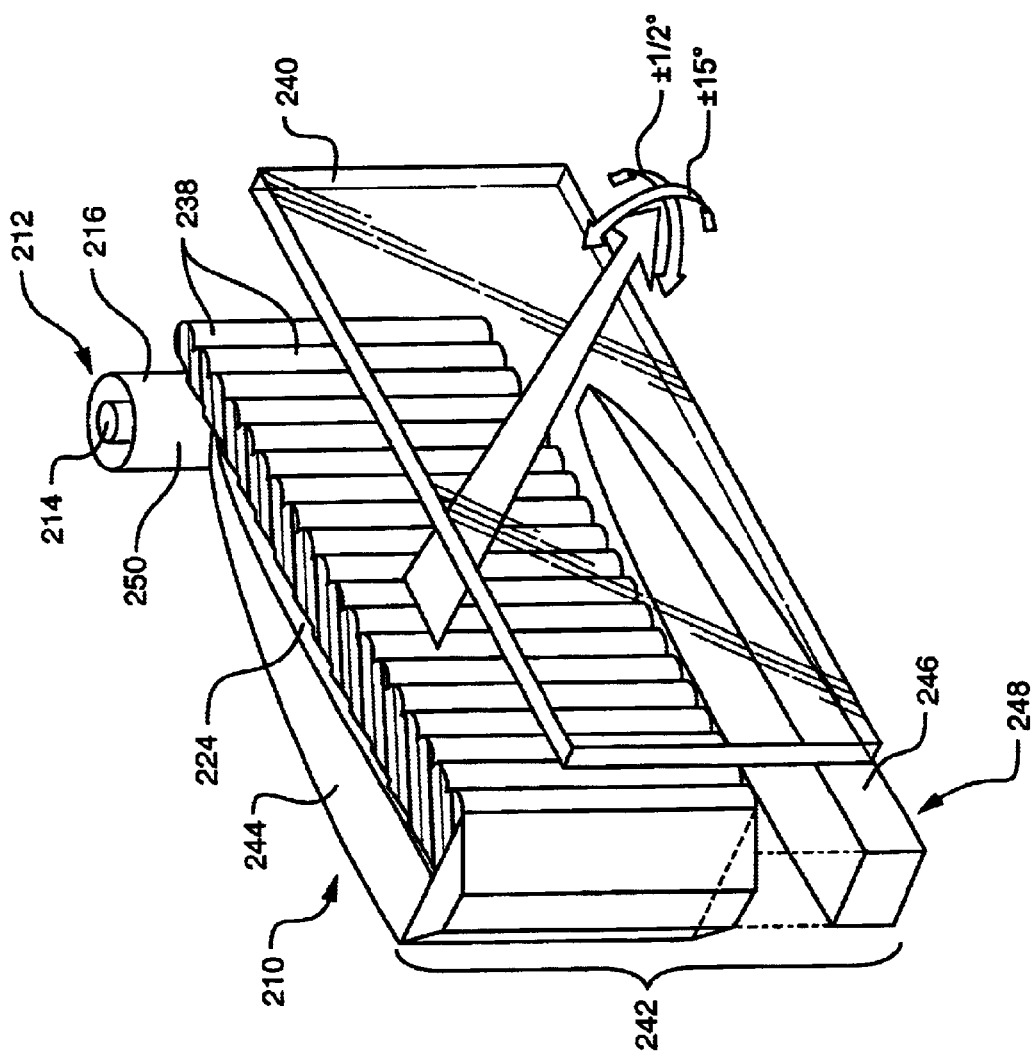
FIGS. 17A–C are diagrammatic illustrations of the collimator of FIG. 1 showing the addition of top and bottom parabolically shaped portions of the waveguide to provide collation in a direction parallel to the axis of the fluorescent tube utilized to provide the lambertian light source.
Figure 18:
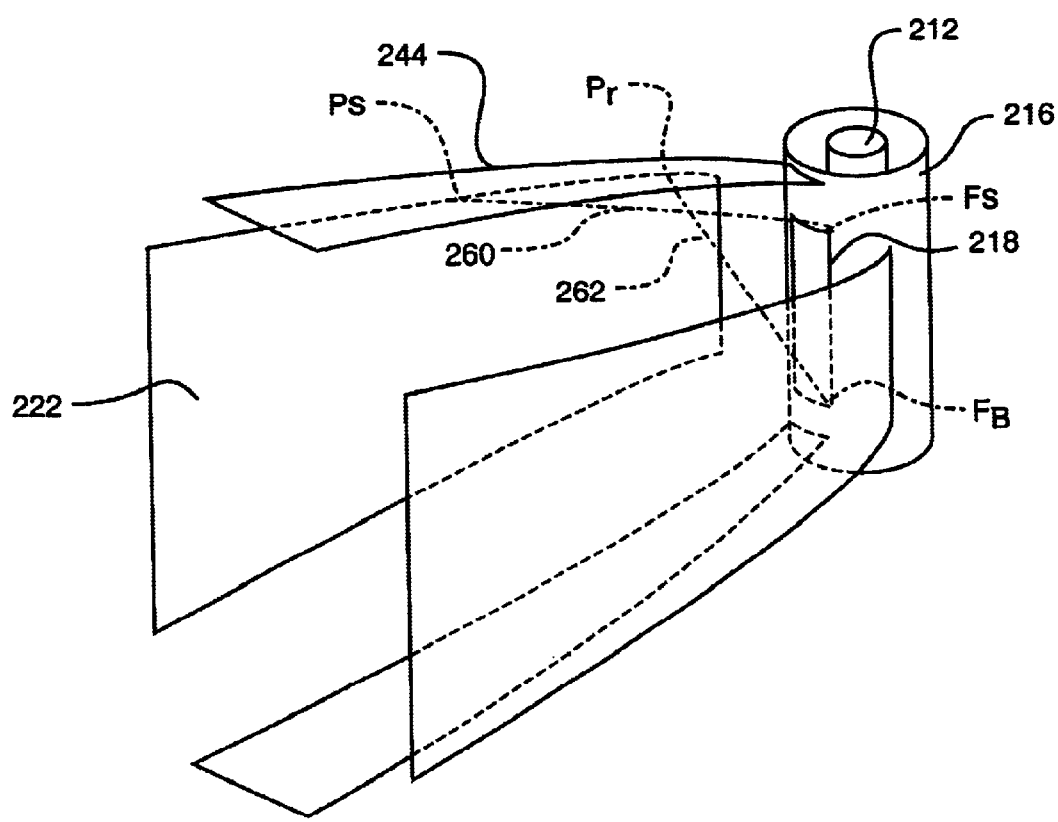
FIG. 18 is a diagrammatic representation of the initial collimating elements showing the parabolic surfaces used therefor.

Referring now to FIG. 17A, an exploded view of collimator 210 illustrates how the remainder of the parabolic collimator is provided. Here a top portion of waveguide 210 is illustrated at 242 which has a parabolic surface 244 that has as its focus the bottom edge of exit slit 218. Likewise, a bottom portion of collimator 210, here illustrated at 246, carries with it a parabolic surface 248, with the focus of this parabola being the top edge 250 of exit slit 218.

Figure 17B:
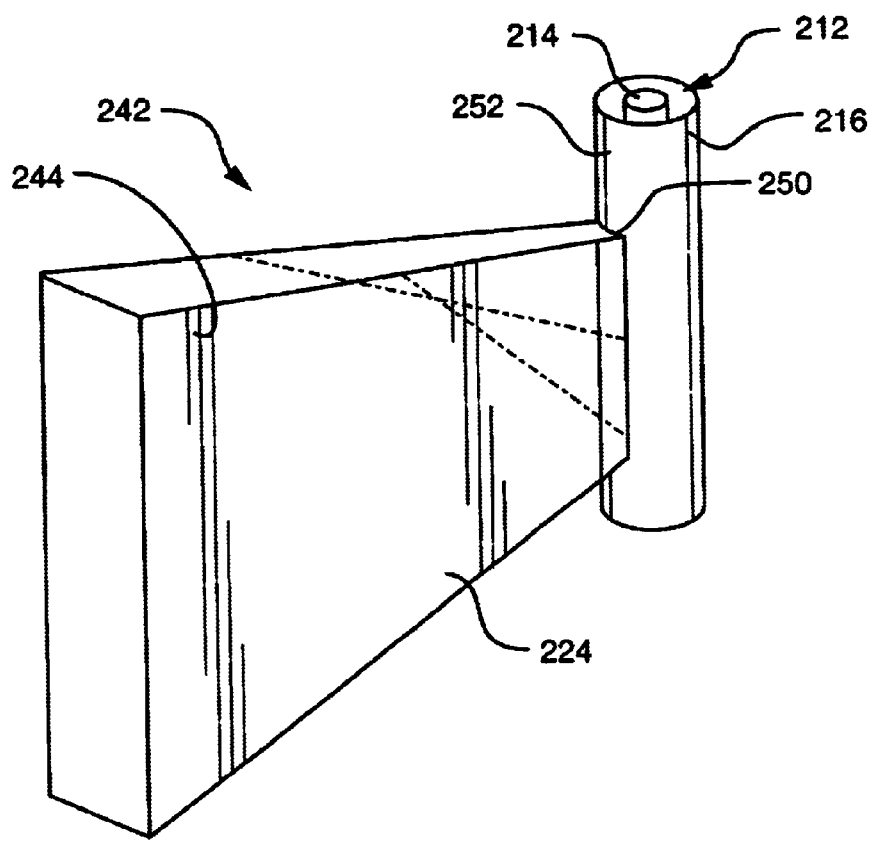
Figure 17C:
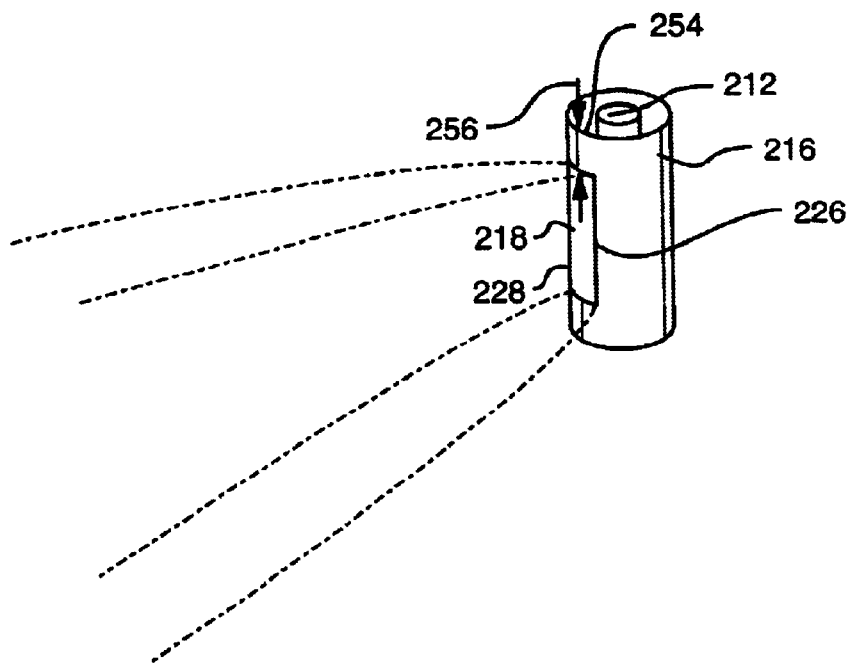

Referring now to FIG. 17B, it will be appreciated that the entrance aperture 250 of parabolic surface 244 is moved down reflector 216, with reflector 216 extending above edge 250. It will be also appreciated that as illustrated in FIG. 17C, exit slit 218 in reflector 216 is spaced from top edge 254 by a distance illustrated by arrow 256.

Referring now to FIG. 18 what is illustrated are the crossed parabolic elements of the collimator showing the generation of the parabolic surfaces based on the edges of exit slit 218. Here it can be seen that a point $P_S$ on surface 222 is generated as illustrated by line 260 from focus $F_S$ which is on the opposed edge of exit slit 218.

Likewise, a point $P_T$ on the top parabolic surface 244 is, as illustrated by line 262, focused on a point of $F_B$ is on an edge 264 which is opposed to the top parabola.

Figure 19:
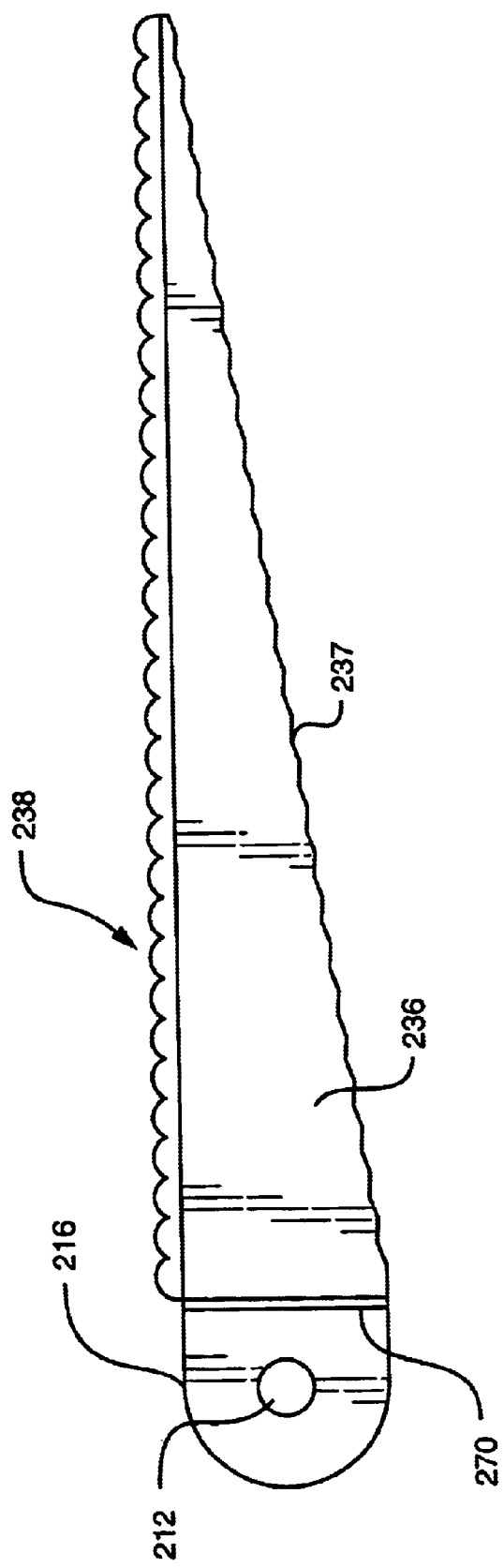
FIG. 19 is a side view of a collimating light source utilizing a collimating sheet as opposed to a collimating waveguide, showing the sheet being positioned between a fluorescent tube light source and the end of a reflective array with 45 degree stepped reflector elements and collimating lenses on the face thereof.

Referring now to FIG. 19, while in FIGS. 16 through 18 an extended collimator is illustrated in which waveguide 220 typically is on the order 6 inches long, there are applications for which that amount of space is not available. In the embodiment illustrated in FIG. 19, light source 212 along with its reflector 216 is positioned to one side of a collimating sheet 270 placed at the entrance aperture of reflective array 236 which has the same cylindrical lens array 238 on the front surface thereof as described in connection with FIG. 16.

Figure 20:
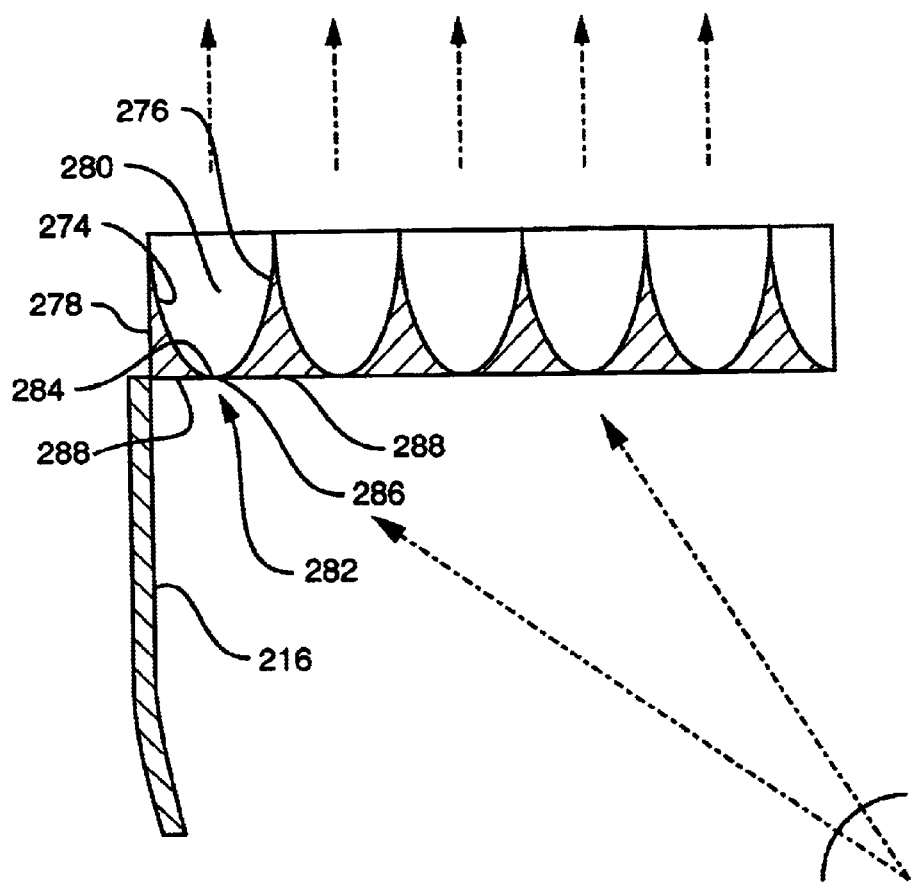
FIG. 20 is a diagrammatic illustration of the collimating sheet of FIG. 19 in which the sheet is provided with internal parabolic reflectors, each of which is focused on an edge of a slit which opposes the parabolic reflector.

Referring now to FIG. 20, in order for the collimator to be made compact, it is important that the entrance apertures for the collimator be exceedingly narrow. While in the embodiment of FIG. 16 the width of the exit slit was on the order of millimeters, in order to collapse the distance required for the collimator, the slit-like entrance apertures of sheet 270 must be in the micron range. One cannot go much smaller than the micron range because the structure produced will have diffractive qualities which are not intended.

As can be seen in FIG. 20, sheet 270 has a top surface 272 and a bottom surface 274. The sheet generally is made of metal, silicon, or glass in which parabolic surfaces 274 and 276 are provided. In one embodiment the sheet is made of metal as illustrated at 278 and the surfaces are etched into the metal, leaving voids 280 therebetween. Alternatively, voids 280 can be filled with transparent material such as glass or plastic to protect the reflective surfaces.

For each of the parabolas there is a slit-like aperture generally illustrated at 282 which is bounded by edges 284 and 286, with the width of apertures 282 being in the micron range. The parabolas may have the crossed parabolic structure as described in FIGS. 16–18. Alternatively, the parabolas may be cylindrical symmetrical parabolas.

As illustrated, the space between apertures 282 of adjacent parabolas is provided with a reflective coating 288 to reflect back any light from light source 212 which does not enter the associated aperture. This light is reflected back towards the apertures by reflector 216 such that eventually all or nearly all the light from light source 212 is collimated and exits sheet 270.

Figure 21:
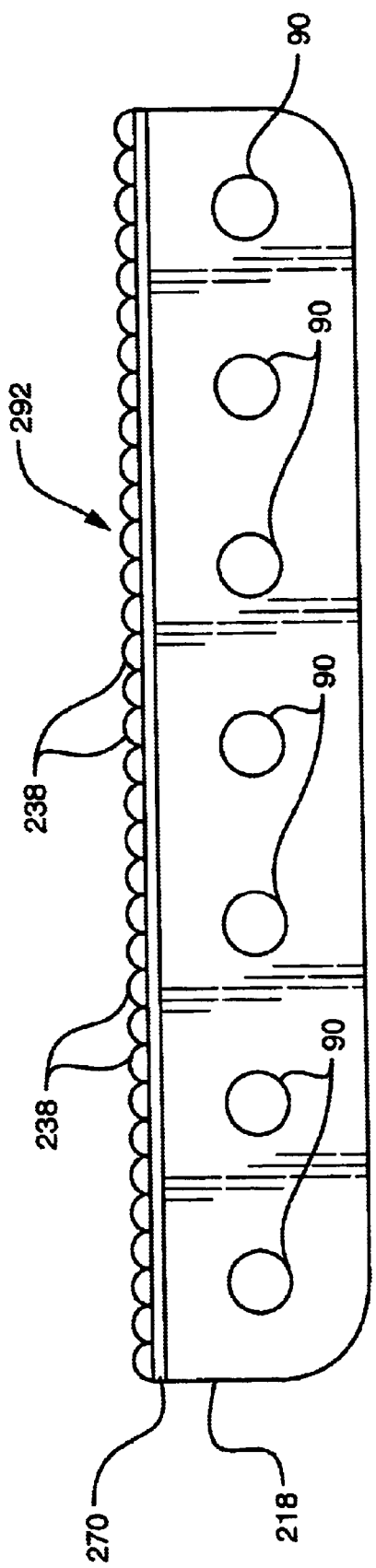
FIG. 21 is a diagrammatic representation of a light source for use with the collimating sheet of FIG. 20 in which either a serpentine fluorescent tube is utilized or in which a plurality of parallel mounted fluorescent tubes are used to eliminate the need for the reflective array of FIG. 19.

Referring now to FIG. 21, it will be appreciated that in order to eliminate the necessity of providing a reflective array to obtain a panel of collimated light a number of fluorescent tubes 290 can be provided, or the tube can be serpentine in nature. This in essence provides a panel of uncollimated light. This light is reflected by reflector 216 towards the collimating sheet 270 and thence, in this embodiment, rather than to a reflective array, directly to a sheet 292 carrying the cylindrical collimating lenses 238.

It will be appreciated that either for the folded reflective array of FIG. 16 or for the directly illuminated array of FIG. 19, the interface between the reflective array and the cylindrical lens array is to be provided by an adhesive material which has an index of refraction less than either of the two interfaced elements. The purpose of this is to provide the required internal reflection.

In one embodiment, the precursors for the genetic algorithm are as follows, written in FORTRAN with special optical design calls through ASAP, Advanced System Analysis Program, available from Breault Research Corporation of Tucson, Ariz.:

```
!*********************************************************
!**
!** Initial setup for design of Diffractive color Separator
!** testing for genetic algorithm components
!**
!**
!*********************************************************
!!********************************************************
$ECHO NONE
$ERR bottom
UNITS UM
BEAMS COHERENT DIFFRACTIVE
WLB=0.437
COL=2
WLG=0.540
WLR=0.611
GT=1100
DCST=100
EAT=100
EBT=100
POLT=100
LCT=5
VLW=17.5/2
HLW=17.5/2
TFTHW=17.5/2
TFTHH=17.5/2
VS=99.2
HS=130
HGRID=10
VGRID=10
RH1=0.0
GH1=99.2
BH1=-99.2
RH2=(RH1)+3*99.2
RH3=(RH1)-3*99.2
GH2=(GH1)+3*99.2
GH3=(GH1)-3*99.2
BH2=(BH1)+3*99.2
BH3=(BH1)-3*99.2
PI=ACOS(-1)
PARABASAL 8
NB=1.500
NG=1.496
NR=1.491
MEDIA; (NB) (NG) (NR) 'ACRYLIC'
F=((DCST)+2*(GT)+(EAT)+(POLT)+(EBT)+100)
D=4.5
DIVERG=0.10
WAVELENGTH (WLB) (WLG) (WLR)
MEDIA; 1.500 1.498 1.496 'CORN_LCD_GLASS' !!UNKNOWN
MEDIA; 1.4872 1.4861 1.4859 'EPOXY_A' !!UNKNOWN
MEDIA; 1.4872 1.4861 1.4859 'EPOXY_B' !!UNKNOWN
MEDIA; 1.500 1.498 1.496 'DCF' !!UNKOWN
MEDIA; 1.4872 1.4861 1.4859 'LIQ_CRYS' !!UNKNOWN
MEDIA; 1.4872'0 1.4861'0 1.4859'0 'POL_MAT' !!'ORD' !!UNKNOWN
!!1.4872'5 1.4861'5 1.4859'5 CRYSTAL 0 0 1 ORD 'POL_MAT'
!!FRESNEL BOTH
!!SPLIT 1
!*************CT4040WCF GEOMETRY*************************
!
!    CORNING GLASS
```

-continued

```
!
SURFACE !!corning 7059 lcd glass
 PLANE Z 0 RECTANG 500 450
 TUBE Z 0 500 450 (GT) 500 450 1 1
 PLANE Z (GT) RECTANG 500 450
OBJECT; 0.3 !!corning 7059 lcd glass
 INTERFACE COATING +0 CORN_LCD_GLASS ACRYLIC !!propogate only transmission
OBJECT; 0.2 !!corning 7059 lcd glass
OBJECT; 0.1 !!corning 7059 lcd glass
 INTERFACE COATING +0 CORN_LCD_GLASS EPOXY_A !!propogate only transmission
GROUP 0.3:0.1
 SHIFT Z (DCST)
SURFACE !!corning 7059 lcd glass
 PLANE Z 0 0 RECTANG 500 450
 TUBE Z 0 500 450 (GT) 500 450 1 1
 PLANE Z (GT) RECTANG 500 450
OBJECT; 0.3 !!corning 7059 lcd glass
 INTERFACE COATING +0 CORN_LCD_GLASS EPOXY_B
OBJECT; 0.2 !!corning 7059 lcd glass
OBJECT; 0.1 !!corning 7059 lcd glass
 INTERFACE COATING +0 CORN_LCD_GLASS LIQ_CRYS
GROUP 0.3:0.1
 SHIFT Z ((DCST)+(GT)+(EAT)+(POLT)+(EBT))
SURFACE !!corning 7059 lcd glass
 PLANE Z 0 RECTANG 500 450
 TUBE Z0 500 450 (GT) 500 450 1 1
 PLANE Z (GT) RECTANG 500 450
OBJECT; 0.3 !!corning 7059 lcd glass
 INTERFACE COATING +0 CORN_LCD_GLASS LIQ_CRYS
OBJECT; 0.2 !!corning 7059 lcd glass
OBJECT; 0.1 !!corning 7059 lcd glass
 INTERFACE COATING +0 CORN_LCD_GLASS EPOXY_B
GROUP 0.3:0.1
 SHIFT Z ((DCST)+2*(GT)+(EAT)+(POLT)+(EBT)+(LCT))
SURFACE !!corning 7059 lcd glass
 PLANE Z 0 RECTANG 500 450
 TUBE Z 0 500 450 (GT) 500 450 1 1
 PLANE Z (GT) RECTANG 500 450
OBJECT; 0.3 !!corning 7059 lcd glass
 INTERFACE COATING +0 CORN_LCD_GLASS EPOXY_A
OBJECT; 0.2 !!corning 7059 lcd glass
OBJECT; 0.1 !!corning 7059 lcd glass
 INTERFACE COATING +AR CORN_LCD_GLASS AIR
GROUP 0.3:0.1
 SHIFT Z ((DCST)+3 *(GT)+2*(EAT)+2*(POLT)+2*(EBT)+(LCT))
!
!    BIREFRIGNENT ABSORBITIVE POLARIZER
!
SURFACE !!polarizer based on polaroid
 PLANE Z 0 RECTANG 500 450
 TUBE Z 0 500 450 (POLT) 500 450 1 1
 PLANE Z (POLT) RECTANG 500 450
OBJBCT; 0.3 !!polarizer based on polaroid
 INTERFACE COATING +0 POL_MAT EPOXY_A !!propogate only transmission
OBJECT; 0.2 !!polarizer based on polariod
OBJBCT; 0.1 !!polarizer based on polariod
 INTERFACE COATING +0 POL_MAT EPOXY_B !!propogate only transmission
GROUP 0.3:0.1
 SHIFT Z ((DCST)+(GT)+(EAT))
SURFACE !!polarizer based on polaroid
 PLANE Z 0 RECTANG 500 450
 TUBE Z 0 500 450 (POLT) 500 450 1 1
 PLANE Z (POLT) RECTANG 500 450
OBJECT; 0.3 !!polarizer based on polariod
 INTERFACE COATING +0 POL_MAT EPOXY_B !!propogate only transmission
OBJECT; 0.2 !!polarizer based on polariod
OBJECT; 0.1 !!polarizer based on polariod
 INTERFACE COATING +0 POL_MAT EPOXY_A !!propogate only transmission
GROUP 0.3:0.1
 SHIFT Z (DCST)+3*(GT)+2*(EAT)+(POLT)+(EBT)+(LCT))
!
!    EPOXY COATINGS
!
SURFACE !!epoxy based on
 TUBE Z 0 500 450 (EAT) 450 450 1 1
OBJECT; 0.1 !!epoxy based on
 SHIFT Z ((DCST)+(GT))
SURFACE !!epoxy based on
 TUBE Z 0 500 450 (EAT) 450 450 1 1
```

-continued

```
OBJECT; 0.1 !!epoxy based on
SHIFT, Z ((DCST)+3*(GT)+(EAT)+(POLT)+(EBT)+(LCT))
SURFACE !!epoxy based on
 TUBE Z 0 500 450 (EBT) 450 450 1 1
OBJECT; 0.1 !!epoxy based on
SHIFT Z ((DCST)+(GT)+(EAT)+(POLT))
SURFACE !!epoxy based on
 TUBE Z 0 500 450 (EBT) 450 450 1 1
OBJECT; 0.1 !!epoxy based on
 SHIFT Z ((DCST)+3*(GT)+2*(EAT)+2*(POLT)+(EBT)+(LCT))
SURFACE !!LC
 TUBE Z 0 500 450 (LCT) 450 450 1 1
OBJECT;0.1 !!LC
 SHIFT Z ((DCST)+2*(GT)+(EAT)+(POLT)+(EBT))
SURFACE !!DCS MATERIAL
 TUBE Z 0 500 (D*50) (DCST) 500 450 1 1
OBJECT; 0.1 !!DCS
!
!    BLACK MATRIX
!
BMH=((DCST)+2*(GT)+(EAT)+(POLT)+(EBT)-0.00001)
BMV{
Q2=#1
Q1=#2
BMH=#3
VLW=#4
VS=#5
HS=#6
TFTHW=#7
TFTHH=#8
SURFACE
 PLANE Z (BMH) RECTANG (VLW) ((VS)/2)
  SHIFT Y (Q1)*(VS)
$IF INT(((Q1)+5)/2) EQ INT[((Q1)+5)/2]; SHIFT X ((Q2)*(HS)+(HS)/2)
$IF INT(((Q1)+5)/2) NE INT[((Q1)+5)/2]; SHIFT X ((Q2)*(HS))
SURFACE
 PLANE Z (BMH) RECTANG (TFTHW) (TFTHH)
  SHIFT Y ((Q1)*(VS)+(VS)/2-(TFTHH))
$IF INT(((Q1)+5)/2) EQ INT[((Q1)+5)/2]; SHIFT X ((Q2)*(HS)+(HS)/2+(TFTHW))
$IF INT(((Q1)+5)/2) EO INT[((Q1)+5)/2]; SHIFT X ((Q2)*(HS)+(TFTHW))
}
BM{
QI=#1
BMH=#2
VS=#3
VLW=#4
HS=#5
TFTHW=#6
TFTHH=#7
HLW=#8
SURFACE
 PLANE Z (BMH) RECTANG 700 (HLW)
  SHIFT Y ((Q1)*(VS)-(VS)/2+(VS))
LCOUNT=-3
$BMV (LCOUNT) (Q1) (BMH) (VLW) (VS) (HS) (TFTHW) (TFTHH)
LCOUNT=(LCOUNT)+1
$IF (LCOUNT)LT 3; $GO-3
OBJECT; 0.1 0 0.2 0 0.3 0 0.4 0 0.5 0 0.6 0 0.7 0 0.8 0 0.9 0.10 0
 INTERFACE 0 0
OBJECT; 0.11 0 0.12 0 0.13 0 0.14 0 0.15 0
 INTERFACE 0 0
}
$DO 19
{
Q1=(?-5)
$BM Q1 (BMH) (VS) (VLW) (HS) (TFTHW) (TFTHH) (HLW)
}
!!****************DCS DATA & SOURCE BASE********************
WAVELENGTH 0.1
$IF (COL) EQ 1; WL=(WLB); NM=NB
$IF (COL) EQ 2; WL=(WLG); NM=NG
$IF (COL) EQ 3; WL=(WLR); NM=NR
H=SQRT((WL/8)*4*DIVERG/WL)
W=(WL/8)/(H*0.455938)
DCS{
HT=#1
BH1=#2
GH1=#3
RH1=#4
```

-continued

```
BH2=#5
GH2=#6
RH2=#7
BH3=#8
GH3=#9
RH3=#10
F=#11
WLB=#12
WLG=#13
WLR=#14
WI=#15
Q1=#16
HGRID=#17
VGRID=#18
H=#20
W=#19
PI=#21
CSN=0
CSO=0
x=0
Q=-1
X0=(Q)/10
BANG1=ATAN(((HT)-(BH 1))/(F))
GANG1=ATAN(((HT)-(GH 1))/(F))
RANG1=ATAN(((HT)-(RH 1))/(F))
BANG2=ATAN(((HT)-(BH2))/(F))
GANG2=ATAN(((HT)-(GH2))/(F))
RANG2=ATAN(((HT)-(RH2))/(F))
BANG3=ATAN(((HT)-(BH3))/(F))
GANG3=ATAN(((HT)-(GH3))/(F))
RANG3=ATAN(((HT)-(RH3))/(F))
BBET1=(PI)*(D)*SIN(BANG1)/(WLB)
GBET1=(PI)*(D)*SIN(GANG1)/(WLG)
RBET1=(PI)*(D)*SIN(RANG1)/(WLB)
BBET2=(PI)*(D)*SIN(BANG2)/(WLB)
GBET2=(PI)*(D)*SIN(GANG2)/(WLG)
RBET2=(PI)*(D)*SIN(RANG2)/(WLB)
BBET3=(PI)*(D)*SIN(BANG3)/(WLB)
GBET3=(PI)*(D)*SIN(GANG3)/(WLG)
RBET3=(PI)*(D)*SIN(RANG3)/(WLB)
CCB1=ATAN((0-(BH1))/(F))
CCG1=ATAN((0-(GH1))/(F))
CCR1=ATAN((0-(RH1))/(F))
CCB2=ATAN((0-(BH2))/(F))
CCG2=ATAN((0-(GH2))/(F))
CCR2=ATAN((0-(RH2))/(F))
CCB3=ATAN((0-(BH3))/(F))
CCG3=ATAN((0-(GH3))/(F))
CCR3=ATAN((0-(RH3))/(F))
PB1=(F)*(NB)/((WLB)*COS(CCB1))
PG1=(F)*(NG)/((WLG)*COS(CCG1))
PR1=(F)*(NB)/((WLR)*COS(CCR1))
PB2=(F)*(NB)/((WLB)*COS(CCB2))
PG2=(F)*(NG)/((WLG)*COS(CCG2))
PR2=(F)*(NB)/((WLR)*COS(CCR2))
PB3=(F)*(NB)/((WLB)*COS(CCB3))
PG3=(F)*(NG)/((WLG)*COS(CCG3))
PR3=(F)*(NB)/((WLR)*COS(CCR3))
RB1=((F)-(X0))*(NB)/((WLB)*COS(BANG1))
RG1=((F)-(X0))*(NG)/((WLG)*COS(GANG1))
RR1=((F)-(X0))*(NR)/((WLR)*COS(RANG1))
RB2=((F)-(X0))*(NB)/((WLB)*COS(BANG2))
RG2=((F)-(X0))*(NG)/((WLG)*COS(GANG2))
RR2=((F)-(X0))*(NR)/((WLR)*COS(RANG2))
RB3=((F)-(X0))*(NB)/((WLB)*COS(BANG3))
RG3=((F)-(X0))*(NG)/((WLG)*COS(GANG3))
RR3=((F)-(X0))*(NR)/((WLR)*COS(RANG3))
CB1=(X0)/(WLB)
CG1=(X0)/(WLG)
CR1=(X0)/(WLR)
CB2=(X0)/(WLB)
CG2=(X0)/(WLG)
CR2=(X0)/(WLR)
CB3=(X0)/(WLB)
CG3=(X0)/(WLG)
CR3=(X0)/(WLR)
CSN1=(SIN(BBET1)*COS(2*(PI)*((PB1)-(RB1)-(CB1)))/(BBET1))
CSN1=(CSN1)+(SIN(GBET1)*COS(2*(PI)*((PG1)-(RG1)-(CG1)))/(GBET1))
CSN1=(CSN1)+(SIN(RBET1)*COS(2*(PI)*((PR1)-(RR1)-(CR1)))/(RBET1))
```

-continued

```
CSN2=(SIN(BBET2)*COS(2*(PI)*((PB2)-(RB2)-(CB2)))/(BBET2))
CSN2=(CSN2)+(SIN(GBET2)*COS(2*(PI)*((PG2)-(RG2)-(CG2)))/(GBET2))
CSN2=(CSN2)+(SIN(RBET2)*COS(2*(PI)*((PR2)-(RR2)-(CR2)))/(RBET2))
CSN3=(SIN(BBET3)*COS(2*(PI)*((PB3)-(RB3)-(CB3)))/(BBET3))
CSN3=(CSN3)+(SIN(GBET3)*COS(2*(PI)*((PG3)-(RG3)-(CG3)))/(GBET3))
CSN3=(CSN3)+(SIN(RBET3)*COS(2*(PI)*((PR3)-(RR3)-(CR3)))/(RBET3))
CSN=CSN1 +CSN2+CSN3
$IF (CSN) GT (CSO); X=(X0)
$IF (CSN) GT (CSO); CSO=(CSN)
$IF (Q) EQ 100; $GO stop
$GO -70
stop
DT=(X)
SURFACE
 PLANE Z-100+(DT) RECTANG 1E3 (D/2)
 SHIFT Y (D)*(Q1)
 TUBE Z-100+(DT) 1E3 (D/2) 0 1E3 (D/2) 1 1
 SHIFT Y (D)*(Q1)
OBJECT; 0.1 0 0.2 0
 INTERFACE COATING +0 AIR ACRYLIC
ST=(DT)-((DTIWL)-INT(DT/WL))*(WL)
WAVELENGTH (WL)
WIDTH (W) (H)
GRID RECT Z-100.0+(ST)-1000 1000-(D)/2 (D)/2 (HGRID) (VGRID) RANDOM 1.0
 SOURCE DIR 0 0 1
 SHIFT Y (D)*Q
}
$DO 0 INT(500/D)
{
HT=?*(D)-250
Q1=?-INT(250/D)
$DCS (HT) (BH1) (GH1) (RH1) (BH2) (GH2) (RH2) (BH3) (GH3) (RH3) (F) (WLB) (WLG)
(WLR) (WL) (Q1),
 (HGRID) (VGRID) (D) (W) (H) (PI)
A?=DT
$REG A?
C?=CSO
$REG C?
}
$STO DEPTH A22 A90
!!
!! DETECTOR
!!
SURFACE
 PLANE Z 0 RECTANG 200 150
 SHIFT Z ((DCST)+2*(GT)+(EAT)+(POLT)+(EBT)+(LCT)+0.01)
OBJECT; 0.1 'DETECTOR'!!
!!*****************ANALYSIS***********************
WIN X Y
PIXEL 140
CONSIDER ALL
TRACE
!!ONLY DETECTOR
WIN X -200 200 Y -150 150
FIELD ENERGY ((DCST)+2*(GT)+(EAT)+(POLT)+(EBT)+0.0001)
DISPLAY
$IF (COL) EQ 0; WRITE BLUE
$IF (COL) EQ 1; WRITE BLUE
$IF (COL) EQ 2; WRITE GREEN
$IF (COL) EQ 3; WRITE RED
WIN X -200 200 Y -150 150
PIXEL 140
$IF (COL) EQ 0; DISPLAY BLUE
$IF (COL) EQ 1; DISPLAY BLUE
$IF (COL) EQ 2; DISPLAY GREEN
$IF (COL) EQ 3; DISPLAY RED
AVERAGE 4 5
ISOMETRIC
bottom
END
```

TRIMODAL LENS

In order to provide for a thinner microlens structure involving significantly less etch step depth and in order to correct for non-symmetrical distribution of light from the non-center subpixels, in one embodiment a trimodal lens is provided with a central region which diffracts the light about a normal thereto in the usual red, green, blue diffraction pattern. This is accomplished by the center third of the lens. The left hand third of the lens has specially configured diffraction lines to provide a blue, red and green diffraction pattern and the right hand third has specially configured diffraction lines to provide a green, blue, red diffraction pattern. The result is that for any sub-pixel, its light comes from the lens segment immediately in front of it and two adjacent lens segments such that the cone of illumination is symmetric about a normal to the microlens array and has the viewing direction. This eliminates the dead zones associated with single mode microlenses.

As a result, all light from a sub-pixel exits in a cone symmetrical about this normal, thereby minimizing the viewing angle discrepancy, and permitting a much simplified diffuser for the liquid crystal display.

In addition to solving the viewing angle discrepancies associated with prior microlens diffractive separators, the subject array of microlenses can be fabricated more exactly due to the thinness of the microlens and decrease in depth of the etching steps. The reason is that since a sub-pixel has light from the three closest symmetrically arranged microlens segments, a single segment need not output light at a larger angle, as in the case with a single mode lens. A significant portion of the etch depth is due to the focusing requirement. With the reduced focusing requirement of the trimodal lens, the total etch depth is reduced dramatically.

The iterative algorithm for defining the stepped structure and the fresnel focusing is now described. For purposes of this invention a genetic algorithm is an iterative method to design the surface profile of the color separator by defining several physical features of the surface profile as genes which are allowed to evolve to an optimal solution. For the present purposes the gene involved is the width of each of the optical elements. Other factors include the design wavelength and the focal plane as physical constraints. Each generation of the genetically defined surface function is scored with a testing function. High scoring surfaces are allowed to go on to the next generation, thus to provide a test of the fit of the surfaces to provide an ideal result.

In the present case the widths and heights of all portions of the design including the diffraction grating and the fresnel portion are provided in terms of a set of seed functions. The resulting surface profile is tested with the testing function, with the testing function giving an overall weight to the profile generated. Succeeding generations of the design are based on the initial seeds plus random elements to allow for genetic variation. Iteratively stepping through this process provides a maximal fit for optimal design.

In one embodiment, with physical constraints as to step width and the overall pixel size, a seed set is generated which includes a particular step width and a pattern of step heights for each element. In one embodiment the microlens is to have a 330 micron diameter. This is broken up into 1.2 micron elements. The seed set generates a surface which is tested using standard diffraction grating theory to ascertain the diffraction efficiency and focusing capability. Standard diffraction grating theory is described in a text entitled Optics by Hecht, p. 312–465 in a section entitled Diffraction. The surface profile of the microlens can be described as a transmission phase grating with non-uniform placement of elements. The test function analyzes the phase contribution from each element from first principles of diffraction theory.

The test determines at a given off axis angle what the expected light intensity should be at a given color. The test also convolves the focusing merit figure, so that after a number of iterations in which random variations are added, an optimal solution is finally achieved.

This is accomplished by crossing for instance 5 seeds with each other. This means that the result of one seed is crossed with the result of another seed, with the results being tested. If 5 seeds are crossed one can obtain as many as 25 testable results. These results are tested and the worst 20 are discarded. The results are then crossed again along with a random seed input to permit the genetic change.

Thus, in general a genetic algorithm is one in which as number of seeds are used to create a result. The results are then crossed with each other to obtain multiple results which are then tested. Superior results are selected and crossed with each other along with a random seed factor and the results tested again. In this manner a large number of results can be tested to determine the optimal result.

In summary, a trimodal microlens configuration is provided for the lenses in a microlens array utilized as a diffraction separator for generating separated bands of different color when the microlens array is provided with a collimated light source. To provide the trimodal functionality, each microlens is divided up into three segments, with the center segment providing a red, green, blue diffraction pattern, with the left segment providing a blue, red, green diffraction pattern, and with the right segment providing a green, blue, red diffraction pattern. This pattern is directed towards an adjacent liquid crystal color display in which its sub-pixels are arranged red, green, blue, with the green sub-pixel aligned with the center segment of the corresponding lens. The result of the trimodal lens is an overlapping of illumination for each of the sub-pixels in that the lens segment aligned with the particular colored sub-pixel provides one third of the light, with the other two thirds of the light being provided by adjacent segments of the lenses in the microlens array. The result of the overlapping illumination of the sub-pixels is that the viewing direction is symmetric about a normal to the array which makes the design of the diffuser used with liquid crystal displays quite simple and eliminates off-axis dead zones. The trimodal structure of the microlens also permits fabrication of a thin lens which minimizes the number of steps for a diffraction grating and focusing lens and thus limits the number of etching steps required as well as making the etching process easier to control.

DETAILED DESCRIPTION

Figure 22:
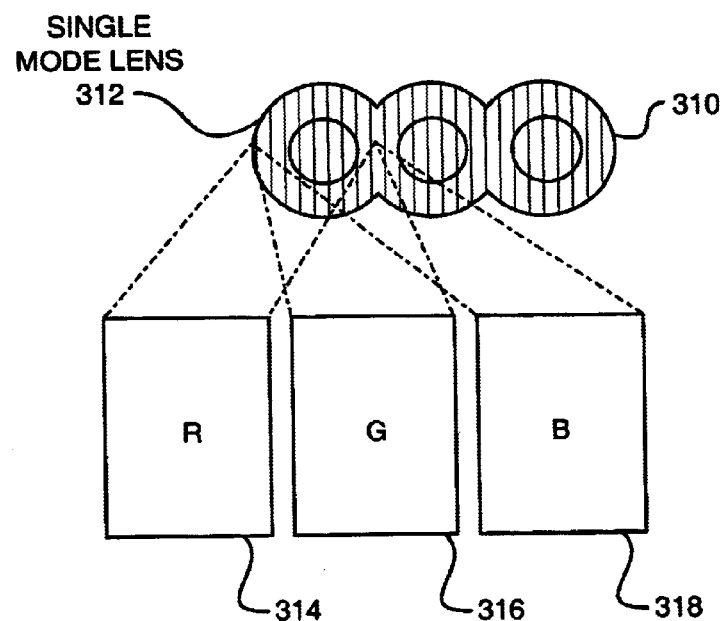
FIG. 22 is a diagrammatic illustration of the diffraction pattern produced by a single mode microlens, illustrating that all portions of the single mode lens contributed to light for each of the red, green and blue bands produced by the microlens.

As illustrated in FIG. 22, a single mode lens array 310 is provided with a number of adjacent single mode lenses 312, with each single mode lens providing bands 314, 316 and 318 of colored light, with the entire lens providing illumination for each of the colored bands.

Figure 23:
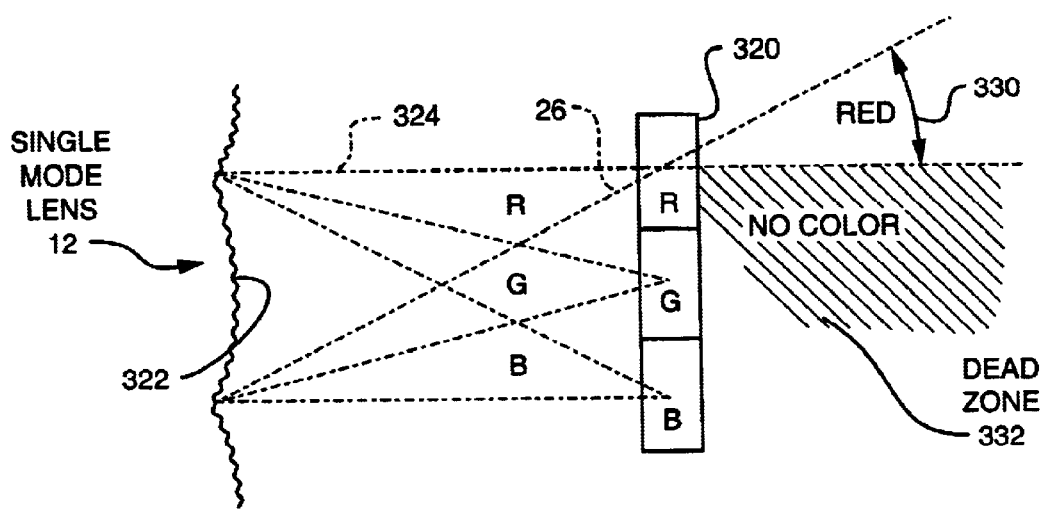
FIG. 23 is a diagrammatic representation of the illumination of a red sub-pixel utilizing a single mode microlens in which there is a region below the normal to the red sub-pixel which carries no color and which will appear black to the viewer when viewed from an off-axis position.

While this type of single mode microlens is quite suitable for use in applications involving improving the brilliance and color saturation of a color liquid crystal display, as illustrated in FIG. 23, the light provided to a red sub-pixel here illustrated at 320, comes from the entire surface 322 of the single mode microlens. The viewing angle for the illumination is illustrated by dashed lines 324 and 326. The result of illuminating sub-pixel 320 in this manner is that the red color is viewable in a zone 330 illustrated by the corresponding double ended arrow, whereas the viewer will see no red color in the dead zone illustrated at 332, without a compensating diffuser, because no light impinges on red sub-pixel 320 from any other microlens.

Figure 24:
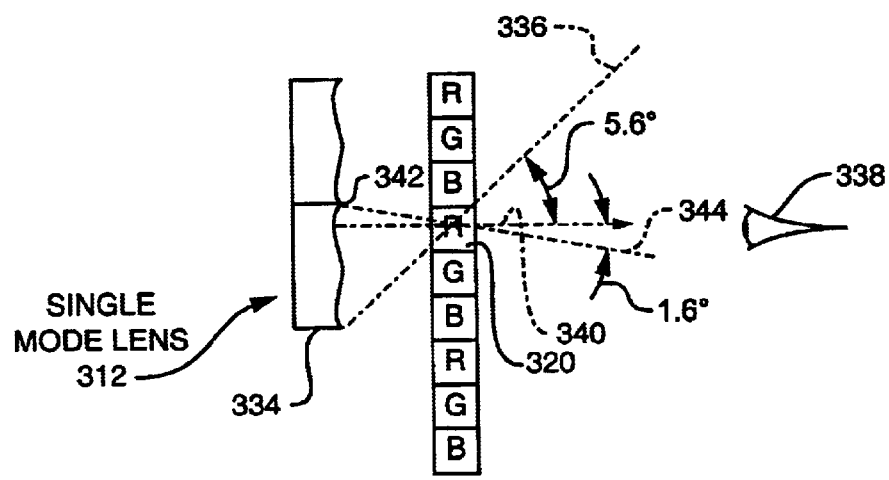
FIG. 24 is a diagrammatic illustration of the off-axis problem associated with a single mode lens in which viewing the red sub-pixel from below 1.6 degrees of the normal results in a lack of ability to view red light from the sub-pixel.

More specifically, and referring to FIG. 24, it will be appreciated that single mode lens 312 provides light from its lowest position here illustrated at 334, such that line 336 through red sub-pixel 320 describes the upper most region at which light is viewable from a position 338. The normal to this red sub-pixel is shown by dashed line 340, whereas the upper extent 342 of lens 312 provides light through sub-pixel 320 as illustrated by dashed line 344. What can be seen from this view is that the red light from this sub-pixel is viewable above the normal to an angle of 5.6 degrees, whereas the viewing angle below the normal is only 1.6 degrees, resulting in the aforementioned dead zone of FIG. 23. The specific angles listed are for one instance of a liquid crystal display panel and will vary depending on the physical characteristics of display. The asymmetric nature of the output will be common to all liquid crystal displays using this technique of color separation.

Figure 25:
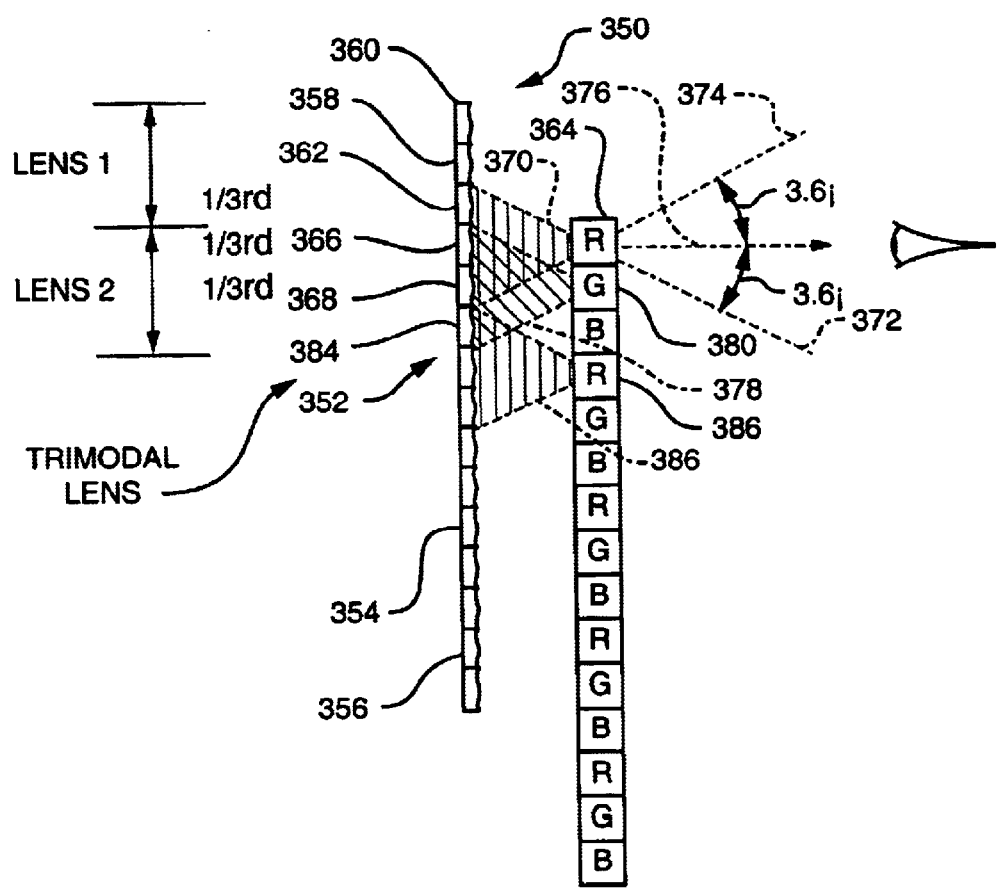
FIG. 25 is a diagrammatic illustration of the utilization of the subject trimodal lens in which light from the red sub-pixel is symmetric about the normal thereto and in which one third of the light for a given sub-pixel comes from the trimodal lens segment immediately opposite the sub-pixel, with the other two thirds of the light coming from trimodal lens segments to either side of this lens segment.

Referring now to FIG. 25, an array of trimodal lenses 350, 352, 354 and 356 is shown with each of the trimodal lenses having a center segment 358, an upper segment 360 and a lower segment 362.

The center segment of each of the trimodal lenses has a diffraction grating which provides a red, green, blue pattern, whereas the upper one third segment of each microlens has a diffraction grating which provides a blue, red, green pattern, whereas the lowest segment has a diffraction grating which provides a green, blue, red pattern.

Thus each of the trimodal lenses is divided into three segments with the center segment providing the usual diffraction pattern and the segments adjacent it providing altered diffraction patterns to meet the requirements that the light from each of the sub-pixels resulting from illumination from the microlenses is symmetric around the normal to the display, and that light from each segment directs colored light to the closest appropriate subpixel, thereby reducing the focusing power needed.

As can be seen in FIG. 25, for a red sub-pixel 364 the light illuminating this sub-pixel comes from segment 362 of Lens 1 as well as from segments 366 and 368 of Lens 2. It will be appreciated that segment 362 is the bottom one third of Lens 1, whereas segment 366 is the top one third of Lens 2 and segment 368 is the central segment of Lens 2. The light illuminating red sub-pixel 364 is indicated by shading 370. The bounds of the red illumination are illustrated by lines 372 and 374 which pass through the center of red sub-pixel 364 such that with respect to a normal 376 to the red pixel, light is symmetrically viewable about the normal as illustrated. In one embodiment the light is viewable 3.6 degrees above and below the normal.

As can be seen by shaded area 378, a green sub-pixel 380 is illuminated by segments 366, 368 and 384. It will also be appreciated is that shaded area 386 shows the illumination of red sub-pixel 386 from three adjacent segments of the lenses in the array.

What will be appreciated is that due to the special configurations of the surfaces of the trimodal lens and the particular diffraction pattern provided by each of the lens segments, each of the sub-pixels is illuminated by three adjacent microlens segments which provides symmetric illumination of a sub-pixel. This means that the off-axis viewing of the liquid crystal display can be compensated for through a simplified diffuser as opposed to a more complicated diffuser which must fill in the dead zones associated with single mode microlenses.

Figure 26:
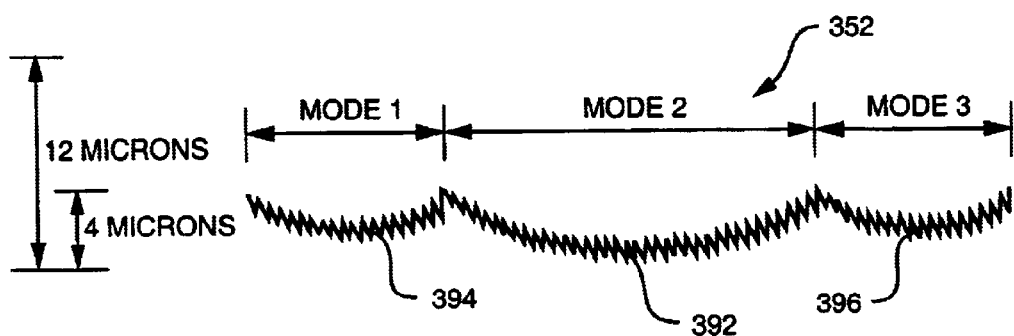
FIG. 26 is a diagrammatic and cross segmental illustration of the subject trimodal microlens in which the center segment produces a predetermined diffraction pattern which is different from that produced by the segments of the lens to either side of this center segment, also illustrating that the relative thickness of the trimodal microlens is about one third that of a single mode microlens.

Referring now to FIG. 26, microlens 352 is illustrated in which the surface of the microlens is divided into three parts corresponding to Modes 1, 2, and 3. As would be expected, the surface 392 of the central third of lens 352 is configured similarly to that of the single mode lens, whereas Modes 1 and 3 having surfaces respectively 394 and 396 are configured in accordance with an iteratively applied genetic algorithm to provide the indicated diffraction bands.

Figure 27:
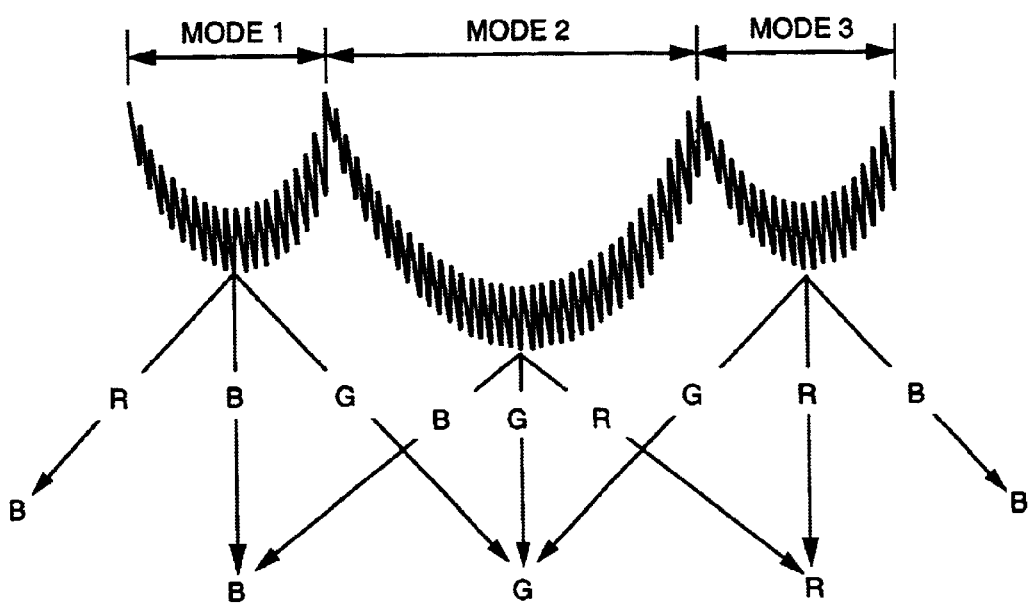
FIG. 27 is a diagrammatic illustration of the diffraction gratings of the three segments the microlens of FIG. 26, in which, the central segment of the microlens provides the traditional red, green, blue diffraction pattern, whereas the segment to one side provides a blue, red, green diffraction pattern and whereas the segment to the other side provides a green, blue, red diffraction pattern; and, FIG. 28 is a diagrammatic representation of an array of trimodal microlenses in which for a red sub-pixel, this sub-pixel derives its illumination from the top third of a microlens which is aligned with a normal to the red sub-pixel, with the red sub-pixel also being illuminated by the diffracted light from a lens segment immediately above the lens segment along the normal and immediately below the lens segment along the normal.

As can be seen in FIG. 27, the diffraction gratings of the three segments of the microlens giving rise to the three modes produce bands of color in the indicated order. It is the fact of the trimodal microlens having three sets of gratings which provides for the appropriate bands of color to be projected onto the correct sub-pixels of the display.

Figure 28:
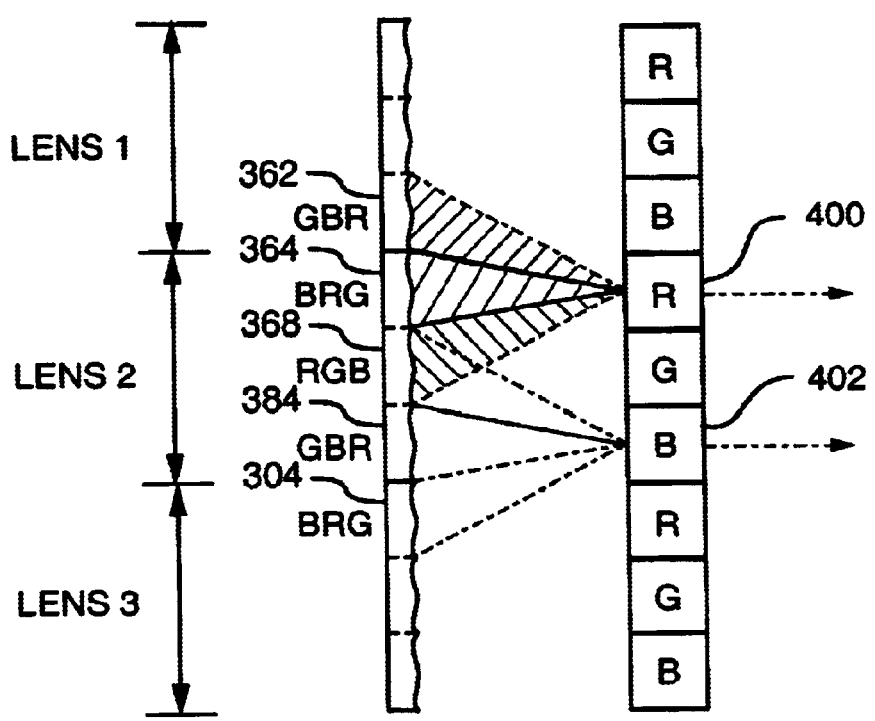

Referring now to FIG. 28, it can be seen that for a given sub-pixel 400 the light impinging thereon from lens segment 362 is the lower portion of the green, blue, red diffraction pattern from this segment of the microlens array. Likewise, for segment 364, the illumination is from the middle portion of the blue, red, green diffraction pattern for this lens segment, whereas for segment 368, the light is from the upper portion of the red, green, blue diffraction pattern.

For sub-pixel 402, light for this sub-pixel is from segment 368 which produces the aforementioned red, green, blue diffraction pattern, whereas segment 384 provides the appropriate light due to its green, blue, red diffraction pattern. Also as illustrated by lens segment 404, light for sub-pixel 402 comes from the upper portion of the diffraction pattern which is the blue, red, green diffraction pattern identical to that of segment 366.

What will be appreciated is that due to the different diffraction patterns for the three segments of each microlens, when the microlenses are arrayed end-to-end, it is possible to provide illumination for a given sub-pixel from three adjacent microlens segments. What this mean is that not only will the viewing angle of the light from the particular sub-pixel be symmetric around the normal thereto, the microlens itself may be one third the thickness of the corresponding single mode microlens due to the decrease in etch step depth necessary to provide the appropriate color separated bands. The reason that the etch step depth is limited in the trimodal lens case is because the colored bands need not be projected off-axis to any great degree, as opposed to the single mode lens in which at least one colored band must be projected off-axis at a rather large angle.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A liquid crystal display that permits direct sunlight viewing, comprising:
   one or more diffractive color separation microlenses for receiving light from a collimated source, each of the microlenses having a surface area including a number of diffraction grating lines designed to perform diffraction separation, with the surface area of at least one microlens having a plurality of segments, where a first of the segments has a first diffraction pattern, second of the segments has a second diffraction pattern, and a third of the segments has a third diffraction pattern.

2. The apparatus of claim 1, further including:
   a color liquid crystal display panel having a plurality of differently colored sub-pixels, wherein each segment directs colored light to a closest appropriate sub-pixel, thereby reducing the focusing Power needed; and
   a diffuser adapted with an anti-reflective coating at its outer surface, the diffuser for diffusing the light from the color liquid crystal display panel.

* * * * *